(12) United States Patent
Stokes

(10) Patent No.: US 8,507,641 B2
(45) Date of Patent: Aug. 13, 2013

(54) PRODUCTION OF VINYLIDENE-TERMINATED AND SULFIDE-TERMINATED TELECHELIC POLYOLEFINS VIA QUENCHING WITH DISULFIDES

(71) Applicant: Chevron Oronite Company LLC, San Ramon, CA (US)

(72) Inventor: Casey D. Stokes, Belle Chasse, LA (US)

(73) Assignee: Chevron Oronite Company LLC, San Ramon, CA (US)

( * ) Notice: Subject to any disclaimer, the term of this patent is extended or adjusted under 35 U.S.C. 154(b) by 0 days.

(21) Appl. No.: 13/765,550

(22) Filed: Feb. 12, 2013

(65) Prior Publication Data

US 2013/0158207 A1   Jun. 20, 2013

Related U.S. Application Data

(62) Division of application No. 13/396,517, filed on Feb. 14, 2012, now Pat. No. 8,383,760, which is a division of application No. 12/256,441, filed on Oct. 22, 2008, now Pat. No. 8,133,954.

(51) Int. Cl.
*C08G 75/04* (2006.01)

(52) U.S. Cl.
USPC ........... 528/376; 525/343; 525/348; 525/371; 525/379; 526/135; 526/154; 526/204; 526/217; 526/221; 526/222; 526/223; 528/487

(58) Field of Classification Search
USPC ................. 525/343, 348, 371, 379; 526/135, 526/154, 204, 217, 221, 222, 223; 528/376, 528/487
See application file for complete search history.

(56) References Cited

U.S. PATENT DOCUMENTS

| | | | |
|---|---|---|---|
| 3,155,686 A | 11/1964 | Prill et al. |
| 3,632,600 A | 1/1972 | Morris et al. |
| 4,034,038 A | 7/1977 | Vogel |
| 4,152,499 A | 5/1979 | Boerzel et al. |
| 4,238,628 A | 12/1980 | Cahill et al. |
| 4,255,538 A | 3/1981 | Skillcorn |
| 4,276,394 A | 6/1981 | Kennedy et al. |
| 4,342,849 A | 8/1982 | Kennedy |
| 4,393,199 A | 7/1983 | Manser |
| 4,468,291 A | 8/1984 | Naarmann et al. |
| 4,486,572 A | 12/1984 | Kennedy |
| 4,568,732 A | 2/1986 | Kennedy et al. |
| 4,758,631 A | 7/1988 | Kennedy et al. |
| 4,814,405 A | 3/1989 | Kennedy |
| 4,910,321 A | 3/1990 | Kennedy et al. |
| 4,929,683 A | 5/1990 | Kennedy et al. |
| 4,943,616 A | 7/1990 | Mishra et al. |
| 4,946,899 A | 8/1990 | Kennedy et al. |
| 4,948,936 A | 8/1990 | Landry |
| 5,032,653 A | 7/1991 | Cheradame et al. |
| 5,066,730 A | 11/1991 | Kennedy et al. |
| 5,112,507 A | 5/1992 | Harrison |
| 5,122,572 A | 6/1992 | Kennedy et al. |
| 5,169,914 A | 12/1992 | Kaszas et al. |
| 5,175,225 A | 12/1992 | Ruhe, Jr. |
| 5,219,948 A | 6/1993 | Storey et al. |
| 5,225,492 A | 7/1993 | Kennedy et al. |
| 5,286,823 A | 2/1994 | Rath |
| 5,300,701 A | 4/1994 | Cherpeck |
| 5,334,321 A | 8/1994 | Harrison et al. |
| 5,336,745 A | 8/1994 | Cheradame et al. |
| 5,340,881 A | 8/1994 | Kennedy et al. |
| 5,350,819 A | 9/1994 | Shaffer |
| 5,366,745 A | 11/1994 | Daden |
| 5,395,885 A | 3/1995 | Kennedy et al. |
| 5,428,111 A | 6/1995 | Faust et al. |
| 5,444,135 A | 8/1995 | Cheradame et al. |
| 5,451,647 A | 9/1995 | Faust et al. |
| 5,464,549 A | 11/1995 | Sieberth |
| 5,488,000 A | 1/1996 | Zhang et al. |
| 5,506,316 A | 4/1996 | Shaffer |
| 5,580,935 A | 12/1996 | Shaffer |
| 5,616,668 A | 4/1997 | Harrison et al. |
| 5,629,394 A | 5/1997 | Cheradame et al. |
| 5,637,647 A | 6/1997 | Faust et al. |
| 5,663,457 A | 9/1997 | Kolp |
| 5,663,470 A | 9/1997 | Chen et al. |
| 5,677,386 A | 10/1997 | Faust et al. |
| 5,690,861 A | 11/1997 | Faust |
| 5,777,044 A | 7/1998 | Faust |
| 5,945,491 A | 8/1999 | Matyjaszewski et al. |
| 5,948,936 A | 9/1999 | Itoh et al. |
| 6,033,446 A | 3/2000 | Cherpeck et al. |
| 6,194,597 B1 | 2/2001 | Faust et al. |

(Continued)

FOREIGN PATENT DOCUMENTS

| DE | 237072 | 7/1986 |
|---|---|---|
| DE | 240308 | 10/1986 |

(Continued)

OTHER PUBLICATIONS

Bae et al., "The Role of Pyridine Derivatives in Living Carbocationic Polymerization: Lewis Base or Nucleophile," Macromol, Symp., 132. 11-23, 1998.

Bae et al., Y. C. and Faust, R., "B-Proton Elimination by Free Bases in the Living Carbocationic Polymerization of Isobutylene", Macromolecules. 30. 7341-7344. 1997. vol. 30. No. 23. J. American Chemical Society.

Bauer et al., "Complexes of stannic chloride and alkyl phenols and the influence of these complexes and of free phenol on the cationic polymerization of isobutene", Can. J. Chem., 48. 1251. 1970.

Bauer et al., "Cationic polymerication of isobutene initiated by stannic chloride and phenols: polymer endgroup studies", J. Poly. Sci., A-1(9), 1451, 1971.

(Continued)

*Primary Examiner* — Robert Jones, Jr.
(74) *Attorney, Agent, or Firm* — Jones Day

(57) ABSTRACT

Provided herein are methods for preparing vinylidene-terminated polyolefins. Further provided herein are sulfide-terminated polyolefins.

52 Claims, No Drawings

(56) References Cited

U.S. PATENT DOCUMENTS

| | | |
|---|---|---|
| 6,407,066 B1 | 6/2002 | Dressen et al. |
| 6,451,920 B1 | 9/2002 | Harrison et al. |
| 6,468,948 B1 | 10/2002 | Rossi et al. |
| 6,515,083 B2 | 2/2003 | Ozawa et al. |
| 6,642,318 B1 | 11/2003 | Chiefari et al. |
| 6,753,391 B1 | 6/2004 | Lewandowski et al. |
| 6,818,716 B2 | 11/2004 | Wendland et al. |
| 6,906,011 B2 | 6/2005 | Harrison et al. |
| 6,969,744 B2 | 11/2005 | Stokes et al. |
| 7,071,275 B2 | 7/2006 | Rath et al. |
| 7,124,110 B1 | 10/2006 | Kemp, II et al. |
| 7,420,019 B2 | 9/2008 | Stokes |
| 7,501,476 B2 | 3/2009 | Stokes |
| 7,575,161 B2 | 8/2009 | Nguyen et al. |
| 7,705,090 B2 | 4/2010 | Stokes |
| 7,709,580 B2 | 5/2010 | Stokes |
| 7,816,459 B2 | 10/2010 | Stokes |
| 8,013,073 B2 | 9/2011 | Stokes |
| 8,133,954 B2 | 3/2012 | Stokes |
| 8,394,897 B2 | 3/2013 | Stokes |
| 2002/0082367 A1 | 6/2002 | McConville et al. |
| 2002/0132905 A1 | 9/2002 | Babinee et al. |
| 2003/0105194 A1 | 6/2003 | Stuart et al. |
| 2003/0162858 A1 | 8/2003 | Faust et al. |
| 2003/0191257 A1 | 10/2003 | Wettling et al. |
| 2004/0015029 A1 | 1/2004 | Lange et al. |
| 2004/0260033 A1 | 12/2004 | Stokes et al. |
| 2005/0282972 A1 | 12/2005 | Stokes et al. |
| 2006/0041081 A1 | 2/2006 | Stokes et al. |
| 2006/0041083 A1 | 2/2006 | Stokes et al. |
| 2006/0041084 A1 | 2/2006 | Stokes et al. |
| 2006/0135721 A1 | 6/2006 | Lange et al. |
| 2006/0264577 A1 | 11/2006 | Faust et al. |
| 2007/0155908 A1 | 7/2007 | Stokes et al. |
| 2007/0155910 A1 | 7/2007 | Stokes |
| 2007/0155911 A1 | 7/2007 | Stokes et al. |

FOREIGN PATENT DOCUMENTS

| | | |
|---|---|---|
| DE | 253827 | 2/1988 |
| DE | 262028 | 11/1988 |
| DE | 262233 | 11/1988 |
| DE | 266104 | 3/1989 |
| DE | 282697 | 9/1990 |
| DE | 296283 | 11/1991 |
| DE | 296284 | 11/1991 |
| DE | 296285 | 11/1991 |
| DE | 296286 | 11/1991 |
| EP | 206756 A2 | 12/1986 |
| EP | 255181 A1 | 2/1988 |
| EP | 342792 A1 | 11/1989 |
| EP | 397081 A2 | 5/1990 |
| EP | 400844 A1 | 5/1990 |
| EP | 341012 B1 | 12/1992 |
| EP | 959096 A1 | 11/1999 |
| EP | 1209170 A1 | 5/2002 |
| EP | 1489109 A2 | 12/2004 |
| GB | 1 159 368 | 4/1987 |
| GB | 2 184 738 A | 7/1987 |
| JP | 2001172567 A | 6/2001 |
| WO | WO 90/05711 | 5/1990 |
| WO | WO 94/13706 | 6/1994 |
| WO | WO 97/19962 A1 | 6/1997 |
| WO | WO 99/09074 | 2/1999 |
| WO | WO 00/75202 A1 | 12/2000 |
| WO | WO 03/106390 A1 | 12/2003 |
| WO | WO2004/048215 A2 | 6/2004 |
| WO | WO 2006/110647 A1 | 10/2006 |

OTHER PUBLICATIONS

Bezumnova et al., "Reaction of 2-mercaptobenzothiazole with ethylenic hydrocarbons" (English abstract), Khim. Geterosikl. Soedin. 80. 194. 1971.

Boileau et al., "Reaction of functionalised thiols with oligoisohutenes via free-radical addition. Some new routes to thermoplastic crosslinkable polymers", European Polymer Journal, 39. 1395-1404, 2003.

Database WPI Section Ch. Week 197201 Derwent Publications Ltd. London, GB; AN 1972-00713T XP002316480—& SU 293 804 A (ND Zelinskii oraanic chem) Jan. 26, 1971 abstract.

De et al., "Carboeationic polymerization of isobutylene using methylaluminum bromide coinitiators: synthesis of bromoallyl functional polyisobutylene", Macromolecules, 39(22), 7527, 2006.

De et al., "Relative Reactivity of C4 olefins toward the polyisobutylene cation," Macromolecules, 39, 6861, 2006.

De et al., "Capping reactions in cationic polymerization: kinetic and synthetic utility", ACS Div. Polym. Chem., Polym. Preprs., 46, 847, 2005.

Diaz et al., "A Polymer Electrode with Variable Conductivity: polypyrrole". J. I. J. Chem. Soc., Chem. Comm. 397-398, 1980.

Diaz et al., "Electrochemical Polymerization of Pyrrole". J. Chem. Soc., Chem Comm., 635-636. 1979.

Evsyukov et al., "Chemical dehydrohalogenation of halogen-containing polymer", Russian Chemical Reviews, 60, 4, 1991.

Faust et al., "Living Carbocationic Polymerization. XXI. Kinetic and mechanical studies of isobutylene polymerization initiated by trimethylpentyl esters of different acids", J. Macromol. Sci.—Chem., A27(6), 649-667, 1990.

Fodor et al., "Synthetic Applications of Non-Polymerizable Monomers in Living Carbocationic Polymerizations", ACS Div. Polym. Chem., Polym. Preprs., 35(2). 492-493, 1994.

Gardini. "The Oxidation of Monocyclic Pyrroles", Adv. Heterocyl. Chem 15(67), 67-99, 1973.

Gonzales de la Campa, J., Pham, Q. Makromol. Chem., 182, 1415, 1981 (English Abstract).

Gorski et al., "Functionalized polyisobutenes by SH-en addition". Die Angewandte Makromolekulare Chemie. 253, 51-64, 1997.

Hadjikyriacou et al., "Cationic Macromolecular Design and Synthesis Using Furan Derivatives", Macromolecules, 32, 6394-6399, 1999.

Hadjikyriacou et al., "Living Coupling Reaction in living cationic polymerization. 3. Coupling reaction of living polyisobutylene using bis(furanyl) derivatives", Macromolecules, 33. 730-733, 2000.

Hamley, Block Copolymers, Encyclopedia of Polymer Science and Technology, 457-482. Mar. 2002.

Higashihara et al., "Synthesis of Poly(isobutylene-block-methyl methzcrylate) by a novel coupling approach", Macromolecules, 39(16). 5275, 2006.

Ipatieff et al., "Reaction of Aliphatic Olefins with Thiophenol" J. Am. Chem. Soc. 60, 2731, 1938.

Ivan et al., "New telechelic polymers and sequential copolymers by polyfunctional initiator-transfer agents (inifers)", J. Poly. Chem. Ed., 18, 3177-3191, 1980.

Ivan et al., "Living carbocationic polymerization. XXX. One-pot synthesis of allyl-terminated linwar and tri-arm star polyisohutylenes, and epoxy-and hydroxy-telechelics therefrom", J. Polym. Sci.: Part A: Polym. Chem., 28, 89-104, 1990.

Kaszas et al., "Electron pair donors in carbocationic polymerization," Polymer Bulletin, 20, 413-419, 1988.

Keki et al., "Dimethyldioxirane as a New and Effective Oxidation Agent for the Epoxidation of a.w-Di(isoblitenyl)polyisoblitylene: A convenient Synthesis of a,w-Di(2-methyl-3-hydroxypropyl)-polyisobutylene", J. Poly. Sci. A Poly. Chem., 40, 3974-3986. 2002.

Kennedy et al., "New Telechelic Polymers and Sequential Copolymers by Polyfunctional Initiator-Transfer Agents (Inifers)", Polym. Bull., 9, 27-32, 1983.

Kennedy et al., "New Telechelic Polymers and Sequential Copolymers by Polyfunctional Initiator Transfer Agents (Inifers) V. Synthesis of a-tert-butyl-w-isopropenylopolyisobutylene and a, w-Di(isoprpcnyl)polyisobutylene", Polymer Bulletin. 1, 575-580, 1979.

Kennedy et al., "New Telechelic polymers and sequential Copolymers by Polyfunctional Initiator Transfer Agents (Inifers) 27 bisphenol and trisphenol polyisobutylenes", Poly. Bull., 8, 563-570. 1982.

Kennedy et al., "Living Carbocationic Polymerization. XXXIX. Isobutylene Polymerization in the Presence of Pyridine and Various Other Electron Donors", Journal of Macromolecular Science, Chemistry, A28(2), 197-207, 1991.

Kim et al.. "Synthesis and Characterization of Novel Silicon-Functional Polyisobutylenes and Their Applications: Polyisobutylene Brushes on Silicate Substrates via Living Cationic Polymerization", Journal of Macromlecular Science Part A—Pure and Applied Chemistry. A40(10), 991-1008, 2003.

Klemm et al., "Untersuchungen zur Thioladdition an Polybutadiene", Angew Makromol. Chem., 207, 187, 1993 (English Abstract).

Klemm et al., "Unusual addition by the thiol-ene photopolymerization", Polym. Bull. (Berlin) 28, 653, 1992.

Koroskenyl et al., "Initiation via haloboration in living cationic polymerization. 6. A novel Method for the synthesis of primary amine functional polyisobutylenes", Pure Appl. Chem., A36( 12), 1879-1893. 1999.

Lenz. "Organic Chemistry of Synthetic High Polymers," Section 7.2 Poly(alkylene Sulfides), Interscience Publishers. New York, p. 196, 1967.

Li et al.. "Polyisobutylene supports—a non-polar hydrocarbon analog of PEG supports", Tetrahedron, 61, 12081-12092, 2005.

Machl et al., "Novel Synthetic Routes to Aminofunctionalized Polyisobutylenes", ACS Div. Polym. Chem. Polym. Preprs., 44(2). 858-859, 2003.

Maenz et al., "Investigation of the structure of low molecular weight polybutadienes and epoxides made therefrom", Acta Polvmerica, 47(5), 208-213, 1996.

Maenz et al., "Macromonomers based on low-molecular-weight polyisobutenes", Angewandte Makromolekulare Chemie, 242, 183-197, 1996.

Maenz et al., "Comb-like polymers from macromonomers based on low-molecular weight poly(isobutene)s", Angewandte Makromolekulare Chemie, 258, 69-73, 1998.

Martinez-Castro et al., "Polyisobutylene Stars and Polyisobutylene-block-poly(tert-butyl methacrylate) block copolymers by site transformation of thiophene end-capped polyisobutylene chain ends", Macromolecules, 36, 6985-6994, 2003.

Mishra et al., "New telechelic polymers and sequential copolymers by polyfunctional initiator transfer agents (inifers) LI. Synthesis and characterization of anisole terminated polyisobutylenes", Poly. Bull., 16, 47-53, 1982.

Morgan et al., "Thiol/Ene Photocurable Polymers", J. Polym. Sci. Polym. Chem. Ed., 15, 627, 1977.

Morgan et al., "Sulfonium Ion Adducts from Quasiliving Polyisobutylene and Alkyl Mono- or Di-sulfides." Polymer Preprints. vol. 50. No. 1. 64-65, 2009.

Nemes et al., "Oxyethylation and Carbonation of Telechelic Polyisobutylene Anions", Poly. Bull. 24, 187-194, 1990.

Nielsen et al., "Synthesis of isobutenyl-telechelic polyisobutylene by functionalization with isobutenyltrimethylsilane", Polymer. 38(10). 2529-2534, 1997, Elsevier Science Ltd.

Nuyken et al., "Novel sulfur containing polymers", Makromol. Chem. Macromol. Symp, 26, 313, 1989.

Nuyken et al., "Telechelics via addition of dithiols onto alkadienes, 1 Radical mechanism", Makromol. Chem. Rapid Commun. 11, 365, 1990.

Nuyken et al., Polym. Bull. (Berlin). 4, 61-65, 1981.

Puskas et al., "The Nature of the Double Bond in Low Molecular Weight Polyisobutylenes and Polybutene Copolymers". J. Polymer Sci: Symposium No. 56, 191, 1976:

Rooney. "Synthesis of Phenol-Terminated Polyisobuylene: competitive chain transfer reactions", J. Appl. Poly. Sci. , 25, 1365-1372, 1980.

Roth et al., "A Novel Method of the Determination of Propagation Rate Constants: Carboeationic Oligomerization of Isobutylene", Macromolecules. J. American Chemical Society. vol. 29. No. 19, 6104-6109, 1996.

Sawamoto et al., "End Functionalized Polymers by Living Cationic Polymerization", Macromolecules, 20(1), 1-6, 1987.

Schriescheim et al., "Industrial Friedel-Crafts chemistry: Past and future", Chemtech. 310, 1978.

Serniuk et al. "Study of the Reaction of Buna Rubbers of Aliphatic Mercaptans", J. Am. Chem. Soc. 70, 1804, 1948.

Si et al., "Living carbocationic polymerization. Narrow molecular weight distribution polyisobutylenes prepared by esters and ketones as electron donors", Polymer Bulletin (Berlin) 33(6), 651-6, 1994.

Simison et al., "End-Quenching of Quasiliving Carbocationic Isobutylene Polymerization with Hindered Bases: Quantitative Formation of exo-Oletin-Terminated Polyisobutylene", Macromolecules, 39, 2481-2487, 2006.

Stacey et al., Organic Reactions: vol. 13, pp. 150-208 and 233-333, 1963.

Storey et al., "N-methylpyrrole-terminated polyisobutylene through end-quenching of quasiliving carbocationic polymerization", Macromolecules, 38(11), 4618-4624, 2005.

Ummadisetty et al., "Rapid Communication: Quantitative Syntheses of Novel Polyisobutylenes Fitted with Terminal Primary -Br, -Oh- NH2, and Methacrylate Termini". J. Poly. Sci. A Poly. Chem., 46. 4236-4242, 2008.

The University of Southern Mississippi, "Synthesis and Characterization of Novel Polyisobutylene Based Materials: Gradient Block Copolymers, Exo-olefins via in situ Quenching, and Carboxylic Acid Functional Telechelics", Dec. 2007.

Wallace et al., "Intelligent Polymer Systems", Encyclopedia of Polymer Science and Technology, 231-250, Jul. 2004.

Wollyung et al., "Intelligent Polymers Systems", J. Poly. Sci. A Poly. Chem., 43, 946-958, 2005.

Zhang et al., "Synthesis of Polyisobutylene with arylamino terminal group by combination of cationic polymerization with alkylation". Poly. Sci. A. Poly. Chem, 46, 936-946, 2008.

Zinger et al., "Timed Release of Chemicals from Polypyrrole Films", J. Am. Chem. Soc. vol. 106, No. 22, 6861-6863, 1984.

Notice of Allowance mailed May 11, 2005, U.S. Appl. No. 10/600,898.

Notice of Allowance mailed May 4, 2009, U.S. Appl. No. 11/186,157.

Final Action mailed Feb. 20, 2009, U.S. Appl. No. 11/186,157.

Office Action mailed Oct. 20, 2008, U.S. Appl. No. 11/186,157.

Office Action mailed Apr. 1, 2008, U.S. Appl. No. 11/186,157.

Notice of Allowance mailed Aug. 6, 2009, U.S. Appl. No. 11/207,264.

Office Action mailed Nov. 12, 2008, U.S. Appl. No. 11/207,264.

Notice of Allowance mailed Apr. 2, 2010, U.S. Appl. No. 11/207,366.

Notice of Allowance mailed Aug. 7, 2009, U.S. Appl. No. 11/207,366.

Office Action mailed Nov. 12, 2008, U.S. Appl. No. 11/207,366.

Office Action mailed Mar. 23, 2007, U.S. Appl. No. 11/207,377.

Final Action mailed Jan. 2, 2008, U.S. Appl. No. 11/207,377.

Notice of Allowance mailed Jun. 11, 2008, U.S. Appl. No. 11/207,377.

Office Action mailed Jan. 8, 2009, U.S. Appl. No. 11/356,490.

Office Action mailed Aug. 31, 2009, U.S. Appl. No. 11/356,490.

Notice of Allowance mailed Apr. 28, 2010. U.S. Appl. No. 11/356,490.

Notice of Allowance mailed Aug. 30, 2010, U.S. Appl. No. 11/356,490.

Notice of Allowance mailed Dec. 3, 2008, U.S. Appl. No. 11/356,491.

Office Action mailed May 13, 2008. U.S. Appl. No. 11/356,491.

Office Action mailed Dec. 5, 2008, U.S. Appl. No. 11/357,562.

Office Action mailed Aug. 7, 2009. U.S. Appl. No. 11/357,562.

Final Action mailed Apr. 2, 2010. U.S. Appl. No. 11/357,562.

Notice of Allowance mailed Apr. 15, 2011, U.S. Appl. No. 11/357,562.

Notice of Allowance mailed Nov. 4, 2011, U.S. Appl. No. 12/256,441.

PRODUCTION OF VINYLIDENE-TERMINATED AND SULFIDE-TERMINATED TELECHELIC POLYOLEFINS VIA QUENCHING WITH DISULFIDES

1. CROSS REFERENCE TO RELATED APPLICATIONS

This application is a divisional application of U.S. patent application Ser. No. 13/396,517, filed Feb. 14, 2012, which is a divisional application of U.S. patent application Ser. No. 12/256,441, filed Oct. 22, 2008, the disclosure of each of which is incorporated herein by reference int its entirety.

2. FIELD

Provided herein are methods for producing vinylidene-terminated polyolefins. Further, provided herein are novel sulfide-terminated polyolefins and methods for producing the same.

3. BACKGROUND

Terminally functionalized polymers are useful precursors for the preparation of polymers containing functional end groups. Examples of terminally functionalized polymers are vinylidene-terminated polyolefins. Polymers containing functional end groups have several useful purposes. For example, polyisobutylene (PIB) containing vinylidene chain ends are utilized in the synthesis of PIB-succinic anhydrides (PIBSAs), which are key intermediates in the production of PIB-based succinimide dispersants for use as additives for engine lubricants. Vinylidene-terminated PIBs are also utilized in the production of PIB-amines, which are useful as fuel additives. An opportunity exists to create polyolefins containing sulfide end groups for use in lubricant applications. These thio-terminated polyolefins can offer oxidation inhibition and surface affinity, two important factors in the design of lubricant additive technology. Thus, there is a need for new classes of terminally functionalized polymers, as well as methods of selectively or exclusively producing terminally functionalized polymers, such as vinylidene-terminate polyolefins and sulfide-terminated polyolefins.

4. SUMMARY

In some embodiments, provided herein are methods for preparing telechelic polyolefins, comprising:
a. ionizing a polyolefin in the presence of a Lewis acid or mixture of Lewis acids to form an ionized polyolefin;
b. reacting the ionized polyolefin from step (a) with one or more disulfides to form an intermediate; and
c. reacting the intermediate of step (b) with one or more alcohols, amines, or thiols.

In some embodiments, provided herein are methods for preparing a vinylidene terminated polyolefin, comprising:
a. ionizing a polyolefin in the presence of a Lewis acid or mixture of Lewis acids to form an ionized polyolefin;
b. reacting the ionized polyolefin from step (a) with one or more disulfides to form an intermediate; and
c. reacting the intermediate of step (b) with one or more alcohols or amines.

In some embodiments, provided herein are methods for preparing a compound of the formula:

or a mixture thereof;
wherein $R^1$ is a polyolefin group;
$R^A$ and $R^B$ are each, independently, alkyl, aryl, aralkyl, alkaryl,

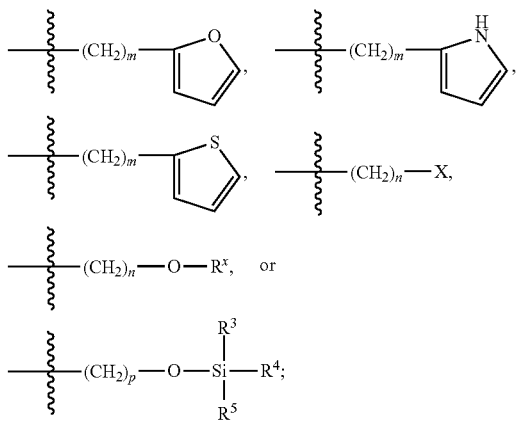

wherein m is 1-3; n is 1-3; p is 1-3;
X is halo or a pseudohalide;
$R^x$ is alkyl or aryl;
$R^3$ is tert-butyl; and
$R^4$ and $R^5$ are each, independently, alkyl, aryl, aralkyl, or alkaryl; comprising:
a. ionizing a polyolefin in the presence of a Lewis acid or mixture of Lewis acids to form an ionized polyolefin;
b. reacting the ionized polyolefin from step (a) with one or more compounds of the formula:

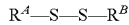

to form an intermediate; and
c. reacting the intermediate of step (b) with one or more alcohols, amines, or thiols.

In some embodiments, provided herein are methods for preparing a compound of the formula:

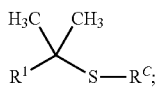

wherein $R^1$ is a polyolefin group; and
$R^C$ is alkyl, aryl, aralkyl, alkaryl, substituted alkyl, or substituted aryl; comprising:
a. ionizing a polyolefin in the presence of a Lewis acid or mixture of Lewis acids to form an ionized polyolefin;
b. reacting the ionized polyolefin with one or more compounds of the formula:

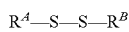

to form an intermediate;
wherein $R^A$ and $R^B$ are each, independently, alkyl, aryl, aralkyl, or alkaryl; and c. reacting the intermediate from step (b) with one or more compounds of the formula:

$$R^C\text{—SH}.$$

In some embodiments, provided herein are compounds of the formula:

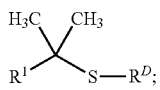

wherein $R^1$ is a polyolefin group;
and $R^D$ is alkyl of 1 to 7 carbons, substituted alkyl of at least 3 carbons, unsubstituted aryl, alkaryl, aralkyl,

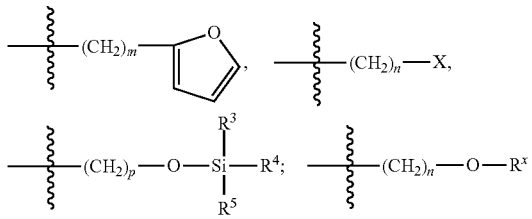

wherein m is 1-3; n is 1-3; p is 1-3;
X is halo or a pseudohalide;
$R^3$ is tert-butyl;
$R^4$ and $R^5$ are each, independently, aryl or alkyl; and
$R^x$ is hydrocarbyl.

Without being limited to any theory, in some embodiments, the methods described herein proceed by the pathway shown in the following scheme:

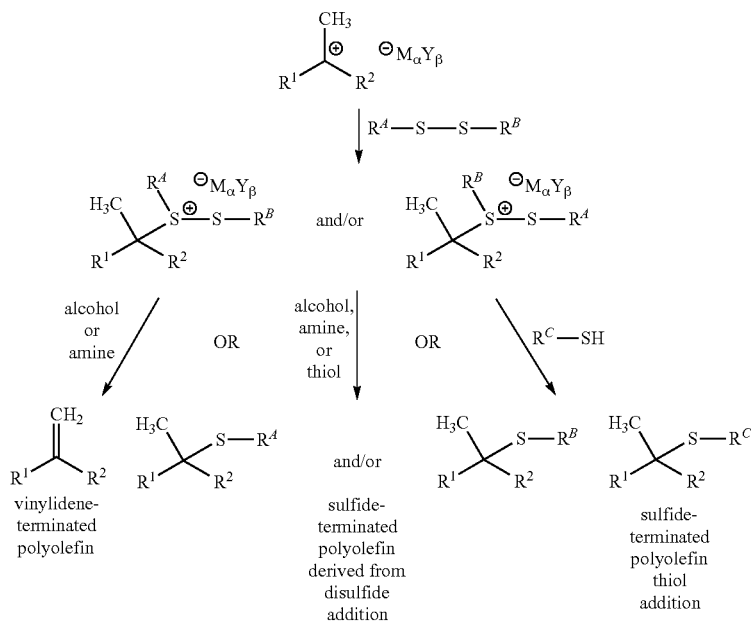

wherein
$R^1$ is a polyolefin group;
$R^2$ is hydrocarbyl or hydrogen;
$R^A$, $R^B$, and $R^C$ are each, independently, hydrocarbyl or substituted hydrocarbyl;

M is a metal, transition metal, or metalloid;
Y is independently halo or alkyl; and
α and β are each, independently, an integer from 1 to 20.

5. DETAILED DESCRIPTION

5.1 Definitions

Unless defined otherwise, all technical and scientific terms used herein have the same meaning as is commonly understood by one of ordinary skill in the art. In the event that there are a plurality of definitions for a term used herein, the definitions provided in this section prevail unless stated otherwise.

As used herein, "alcohol" refers to a compound of the following formula:

R—OH;

wherein R is hydrocarbyl or substituted hydrocarbyl. In some embodiments, the hydrocarbyl is aliphatic. In some embodiments, R is alkyl or substituted alkyl. In some embodiments, the —OH is attached to a primary carbon. In some embodiments, the —OH is attached to a secondary carbon. In some embodiments, the —OH is attached to a tertiary carbon. In some embodiments, the alcohol contains more than one hydroxyl group. In some embodiments, the alcohol contains one hydroxyl group.

As used herein, "alkane" refers to a hydrocarbon containing only single bonds. In some embodiments, the alkane contains a straight hydrocarbon chain. In some embodiments, the alkane contains a branched hydrocarbon chain. In some embodiments, the alkane is cyclic. In some embodiment, the alkane contains 1 to 10 carbons. In some embodiment, the alkane contains 1 to 8 carbons. In some embodiment, the alkane contains 1 to 6 carbons. In some embodiment, the alkane contains 1 to 3 carbons. In some embodiment, the alkane contains 1 to 2 carbons. In some embodiments, the alkane contains 5 to 6 carbons. In some embodiments, the alkane is pentane. In some embodiments, the alkane is hexane. In some embodiments, the alkane is substituted.

As used herein, "alkaryl" refers to an aryl group substituted with at least one alkyl, alkenyl, or alkynyl group.

As used herein, "alkenyl" refers to a hydrocarbon chain or group of about 2 to about 20 carbons, wherein the chain or group contains one or more double bonds. In some embodiments, the alkenyl contains about 2 to about 15 carbons. In some embodiments, the alkenyl contains about 2 to about 10 carbons. In some embodiments, the alkenyl contains about 2 to about 8 carbons. In some embodiments, the alkenyl contains about 2 to about 6 carbons. In some embodiments, the alkenyl contains about 2 to about 3 carbons. In some embodiments, the alkenyl is an allyl group. In some embodiments, the alkenyl group contains one or more double bonds that are conjugated to another unsaturated group. In some embodiments, the alkenyl is substituted.

As used herein, "alkyl" refers to a hydrocarbon chain or group of about 1 to about 20 carbons. In some embodiments, the alkyl contains about 1 to about 15 carbons. In some embodiments, the alkyl contains about 1 to about 10 carbons. In some embodiments, the alkyl contains about 1 to about 8 carbons. In some embodiments, the alkyl contains about 1 to about 6 carbons. In some embodiments, the alkyl contains about 1 to about 3 carbons. In some embodiments, the alkyl contains 1 to 2 carbons. In some embodiments, the alkyl is primary. In some embodiments, the alkyl is secondary. In some embodiments, the alkyl is tertiary. In some embodiments, the alkyl is methyl, ethyl, n-propyl, isopropyl, isobutyl, n-butyl, sec-butyl, tert-butyl, isopentyl, neopentyl, tert-pentyl, or isohexyl. In some embodiments, the alkyl is methyl, ethyl, n-propyl, or isopropyl. In some embodiments, the alkyl is methyl. In some embodiments, the alkyl is tert-butyl. In some embodiments, the alkyl is a straight hydrocarbon chain. In some embodiments, the alkyl is a branched hydrocarbon chain. In some embodiments, the alkyl is cyclic. In some embodiments, the alkyl is substituted.

As used herein, "alkynyl" refers to a hydrocarbon chain or group of about 2 to about 20 carbons, wherein the chain contains one or more triple bonds. In some embodiments, the alkynyl contains about 2 to about 15 carbons. In some embodiments, the alkynyl contains about 2 to about 10 carbons. In some embodiments, the alkynyl contains about 2 to about 8 carbons. In some embodiments, the alkynyl contains about 2 to about 6 carbons. In some embodiments, the alkynyl contains about 2 to about 3 carbons. In some embodiments, the alkynyl is a propargyl group. In some embodiments, the alkynyl group contains one or more triple bonds that are conjugated to another unsaturated group. In some embodiments, the alkynyl is substituted.

As used herein, "amide" refers to a compound of the following formula:

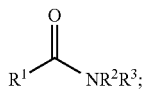

wherein $R^1$-$R^3$ are each, independently, hydrogen or optionally substituted hydrocarbyl. In some embodiments, $R^1$ is hydrogen. In some embodiments, $R^1$ is hydrocarbyl. In some embodiments, $R^2$ is hydrogen. In some embodiments, $R^2$ and $R^3$ are hydrocarbyl. In some embodiments, the amide is N,N-dimethylformamide.

As used herein, "amine" refers to a compound of the following formula:

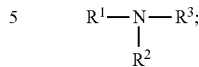

wherein $R^1$, $R^2$, and $R^3$ are each, independently, hydrogen or optionally substituted hydrocarbyl. In some embodiments, $R^1$, $R^2$, and $R^3$ are each, independently, hydrogen or alkyl. In some embodiments, the amine is a primary amine. In some embodiments, the amine is a secondary amine. In some embodiments, the amine is a tertiary amine. In some embodiments, the amine is ammonia.

As used herein, "aralkyl" refers to an alkyl, alkenyl, or alkynyl group substituted with at least one aryl group.

As used herein, "aryl" refers to a monocyclic or multicyclic aromatic group containing from 6 to about 30 cyclic carbons. In some embodiments, the aryl is monocyclic. In some embodiments, the aryl contains about 6 to about 15 cyclic carbons. In some embodiments, the aryl contains about 6 to about 10 cyclic carbons. In some embodiments, the aryl is fluorenyl, phenyl, or naphtyl. In some embodiments, the aryl is phenyl. In some embodiments, the aryl is a substituted aryl. The substituted aryl is a substituted with a hydrocarbyl or a heteroatomic group, including, but not limited thios, thioethers, and halides.

As used herein, "binifer" refers to an inifer that is capable of initiation and propagation at two separate sites of an inifer. In some embodiments, the initiation and propagation occur simultaneously or nearly simultaneously at the two sites.

As used herein, "carbocation terminated polyolefin" refers to a polyolefin containing at least one carbocation end group. Examples include, but are not limited to, compounds of the formula:

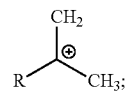

wherein R is a polyolefin group.

As used herein, "chain-end concentration" refers to the sum of the molar concentration of carbocationic end groups and dormant end groups. When a mono-functional initiator is used, the chain-end concentration is approximately equal to the initiator concentration. For a multi-functional initiator, when the functionality of the initiator equals x, then the chain end concentration is approximately equal to x times the initiator concentration.

As used herein, "common ion salt" refers to an ionic salt that is optionally added to a reaction performed under quasiliving carbocationic polymerization conditions to prevent dissociation of the propagating carbenium ion and counter-ion pairs.

As used herein, "common ion salt precursor" refers to an ionic salt that is optionally added to a reaction performed under quasiliving carbocationic polymerization conditions, wherein the ionic salt generates counter-anions that are identical to those of the propagating chain ends, via in situ reaction with a Lewis acid.

As used herein, "diluent" refers to a liquid diluting agent or compound. Diluents may be a single or a mixture of two or more compounds or agents. Diluents may completely dissolve or partially dissolve the reaction components.

As used herein, "disulfide" refers to a compound of the following formula:

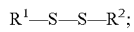

wherein $R^1$ and $R^2$ are each, independently, optionally substituted hydrocarbyl.

As used herein, "electron donor" refers to a molecule that is capable of donating a pair of electrons to another molecule.

As used herein, "halo" refers to halogen. In some embodiments, halo is F, Cl, Br, or I. In some embodiments, halo is F. In some embodiments, halo is Cl. In some embodiments, halo is Br. In some embodiments, halo is I.

As used herein, heteroaryl refers to a monocyclic or multicyclic aromatic ring system containing about 5 to about 15 ring atoms wherein at least one ring atom is a heteroatom. In some embodiments, the heteroaryl contains 5 to about 10 ring atoms. In some embodiments, the heteroaryl contains 5 or 6 ring atoms. In some embodiments, the heteroaryl is monocyclic. In some embodiments, the heteroatom is N, O, or S. In some embodiments, the heteroaryl contains one heteroatom. In some embodiments, the heteroaryl contains 1 to 3 N atoms. In some embodiments, the heteroaryl contains one O or S atom and one or two N atoms. In some embodiments, the heteroaryl is furyl, imidazolyl, pyrimidinyl, tetrazolyl, thienyl, pyridyl, pyrrolyl, thiazolyl, isothiazolyl, oxazolyl, isoxazolyl, thiazolyl, quinolinyl, or isoquinolinyl. In some embodiments, the heteroaryl is furyl. In some embodiments, the heteroaryl is substituted.

As used herein, "hydrocarbyl" refers to a monovalent, linear, branched, or cyclic group which contains carbon and hydrogen atoms, and in certain embodiments, is substituted. In some embodiments, the hydrocarbyl is alkyl, alkenyl, alkynyl, aryl, alkaryl, or aralkyl, each optionally substituted. In some embodiments, the hydrocarbyl is substituted. In some embodiments, the hydrocarbyl is not substituted.

As used herein, "inifer" refers to a compound that acts as both an initiator and a chain transfer agent.

As used herein, "initiator" refers to a compound that provides a carbocation.

As used herein, "ionized polyolefin" refers to a polyolefin containing at least one carbenium ion. In some embodiments, the ionized polyolefin is a tert-halide terminated polyolefin that has been ionized into a cationic polyolefin. In some embodiments, the ionized polyolefin is a quasiliving carbocationic polyolefin. In some embodiments, the ionized polyolefin is a vinylidene-terminated polyolefin that has been ionized into an ionized polyolefin or quasiliving polyolefin. In some embodiments, the ionized polyolefin is a polyolefin containing an olefin that has been ionized into a quasiliving carbocationic polyolefin or a cationic polyolefin. In some embodiments, the ionized polyolefin is derived from an inifer.

As used herein, "Lewis acid" refers to a chemical entity that is capable of accepting a pair of electrons.

As used herein, "metalloid" refers to elements that have properties of both metals and non-metals. In some embodiments, the metalloid is boron or silicon.

As used herein, "mole percent" refers to the proportion of the number of moles of a particular product of a reaction to the number of moles of all products of the reaction multiplied by one hundred.

As used herein, "mono-functional initiator" refers to an initiator that provides approximately one stoichiometric equivalent of carbocation relative to initiator. When a mono-functional initiator is used, the chain-end concentration is approximately equal to the initiator concentration.

As used herein, "monomer" refers to an olefin that is capable of combining with a carbocation to form another carbocation.

As used herein, "multi-functional initiator" refers to an initiator that provides approximately x stoichiometric equivalents of carbocation relative to initiator, wherein x represents the functionality of the initiator. When a multi-functional initiator is used, when the functionality of the initiator equals x, then the chain-end concentration equals x times the initiator concentration. In some embodiments, x is 2, and the initiator is a bifunctional initiator.

As used herein, "nitroalkane" refers to $RNO_2$, wherein R is hydrocarbyl. In some embodiments, R is alkyl.

As used herein, "polyolefin" refers to a polymer that comprises at least two olefin monomers. In some embodiments, the polyolefin has a molecular weight from about 300 to in excess of a million g/mol. In some embodiments, the polyolefin has a molecular weight of from about 200 to 10,000 g/mol. In some embodiments, the polyolefin has a molecular weight of from about 100,000 to 1,000,000 g/mol. In some embodiments, the polyolefin has a molecular weight greater than 200 g/mol. In some embodiments, the polyolefin has a molecular weight greater than 400 g/mol. In some embodiments, the polyolefin has a molecular weight greater than 600 g/mol. In some embodiments, the polyolefin has a molecular weight greater than 800 g/mol. In some embodiments, the polyolefin has a molecular weight greater than 1000 g/mol. In some embodiments, the polyolefin has a molecular weight greater than 5000 g/mol. In some embodiments, the polyolefin has a molecular weight greater than 10,000 g/mol. In some embodiments, the polyolefin has a molecular weight greater than 100,000 g/mol. In some embodiments, the polyolefin has a molecular weight greater than 500,000 g/mol. In some embodiments, the polyolefin has a molecular weight greater than 1,000,000 g/mol.

As used herein, "polyolefin group" refers to monovalent polyolefin substituent.

As used herein, "pseudohalide" refers to a substituent that resembles the reactivity of a halide substituent, for example, cyano, azido, cyanate, thiocyanate, or isothiocyanate.

As used herein, "quasiliving carbocationic polyolefin" refers to a carbocationic polyolefin that has been formed under quasiliving carbocationic polymerization conditions.

As used herein, "quasiliving carbocationic polymerization conditions" refers to conditions that allow for quasiliving polymerizations, which are polymerizations that proceed with minimal irreversible chain termination and minimal chain transfer. Quasiliving polymerizations proceed by initiation followed by propagation, wherein propagating (living) species are in equilibrium with non-propagating (non-living) polymer chains.

As used herein, "substituted" refers to the presence of one or more substituents. In some embodiments, only one substituent is present. In some embodiments, the substituent is alkyl. In some embodiments, the substituent is alkenyl. In some embodiments, the substituent is alkynyl. In some embodiments, the substituent is aryl. In some embodiments, the substituent is alkaryl. In some embodiments, the substituent is aralkyl. In some embodiments, the substituent is halo. In some embodiments, the substituent is heteroaryl. In some embodiments, the substituent is heteroalkyl. In some embodiments, the substituent is

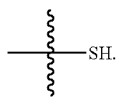

In some embodiments, the substituent is

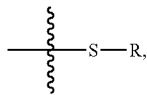

wherein R is alkyl, aryl, aralkyl, or alkaryl. In some embodiments, the substituent is furyl. In some embodiments, the substituent is

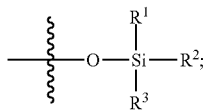

wherein $R^1$-$R^3$ are each, independently, optionally substituted hydrocarbyl. In some embodiments, the substituent is

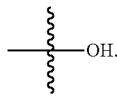

In some embodiments, the substituent is

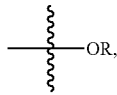

wherein R is alkyl, aryl, aralkyl, or alkaryl. In some embodiments, the substituent is a pseudohalide.

As used herein, "telechelic polyolefin" refers to a polyolefin having a functionalized endgroup.

As used herein, "tert-halide terminated polyolefin" refers to a polyolefin that contains at least one tertiary halide end group. In some embodiments, the tert-halide terminated polyolefin has the following formula:

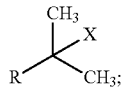

wherein R is a polyolefin group and X is halo.

As used herein, "thiol" refers to a compound of the following formula:

wherein R is optionally substituted hydrocarbyl.

As used herein, "trinifer" refers to an inifer that is capable of initiation and propagation at three separate sites of an inifer. In some embodiments, the initiation and propagation occur simultaneously or nearly simultaneously at the three sites.

As used herein, "vinylidene-terminated polyolefin" refers to a polyolefin that contains at least one vinylidene end group. In some embodiments, the vinylidene-terminated polyolefin has the following formula:

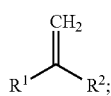

wherein $R^1$ is a polyolefin group and $R^2$ is optionally substituted hydrocarbyl or hydrogen. In some embodiments, $R^2$ is hydrocarbyl.

5.2 Methods

5.2.1 Overview

In some embodiments, provided here are methods for preparing telechelic polyolefins.

Without being limited to any theory, in some embodiments, the methods described herein proceed by the pathway shown in the following scheme:

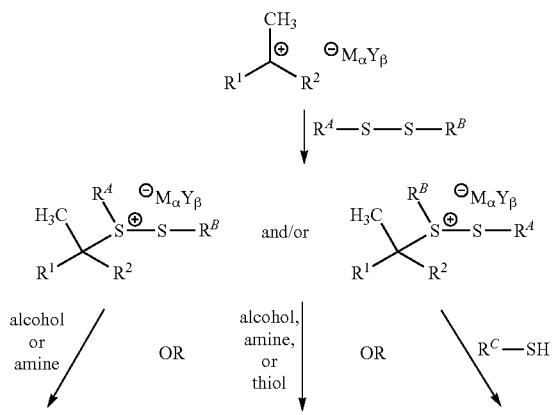

-continued

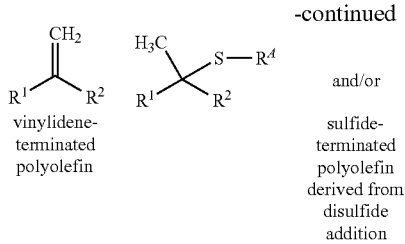 and/or 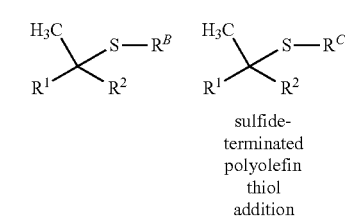

vinylidene-terminated polyolefin | sulfide-terminated polyolefin derived from disulfide addition | sulfide-terminated polyolefin thiol addition wherein
$R^1$ is a polyolefin group;
$R^2$ is hydrocarbyl or hydrogen;
$R^A$, $R^B$, and $R^C$ are each, independently, hydrocarbyl or substituted hydrocarbyl;
M is a metal, transition metal, or metalloid;
Y is independently halo or alkyl; and
α and β are each, independently, an integer from 1 to 20.

In some embodiments, $^-M_\alpha Y_\beta$ is derived from a Lewis acid described herein. In some embodiments, $^-M_\alpha Y_\beta$ is derived from a titanium halide. In some embodiments, $^-M_\alpha Y_\beta$ is $^-Ti_2Cl_9$.

Without being limited to any theory, the following compounds are stable intermediates in the methods disclosed herein at low temperature:

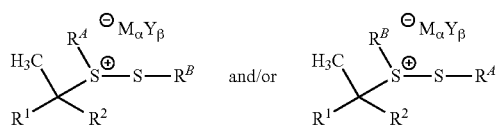

In some embodiments, such intermediates are observable by spectroscopy.

In certain embodiments, provided herein are methods for preparing a vinylidene terminated polyolefin, comprising:
a. ionizing a polyolefin in the presence of a Lewis acid or mixture of Lewis acids to form an ionized polyolefin;
b. reacting the ionized polyolefin from step (a) with one or more disulfides to form an intermediate; and
c. reacting the intermediate of step (b) with one or more alcohols or amines.

In certain embodiments, provided herein are methods for preparing a compound of the formula:

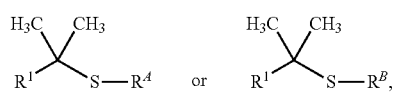

or a mixture thereof;
wherein $R^1$ is a polyolefin group;
$R^A$ and $R^B$ are each, independently, alkyl, aryl, aralkyl, alkaryl,

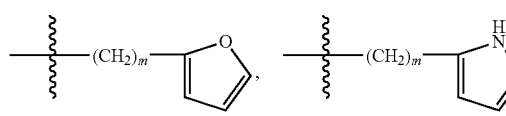

-continued

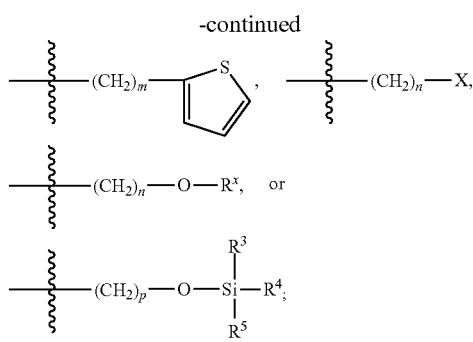

wherein m is 1-3; n is 1-3; p is 1-3;
X is halo or a pseudohalide;
$R^x$ is alkyl or aryl;
$R^3$ is tert-butyl; and
$R^4$ and $R^5$ are each, independently, alkyl, aryl, aralkyl, or alkaryl; comprising:
a. ionizing a polyolefin in the presence of a Lewis acid or mixture of Lewis acids to form an ionized polyolefin;
b. reacting the ionized polyolefin from step (a) with one or more compounds of the formula:

to form an intermediate; and
c. reacting the intermediate of step (b) with one or more alcohols, amines, or thiols.

In certain embodiments, provided herein are methods for preparing a compound of the formula:

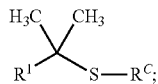

wherein $R^1$ is a polyolefin group; and
$R^C$ is alkyl, aryl, aralkyl, alkaryl, substituted alkyl, or substituted aryl; comprising:
a. ionizing a polyolefin in the presence of a Lewis acid or mixture of Lewis acids to form an ionized polyolefin;
b. reacting the ionized polyolefin with one or more compounds of the formula:

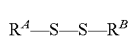

to form an intermediate;
wherein $R^A$ and $R^B$ are each, independently, alkyl, aryl, or substituted aryl; and
c. reacting the intermediate from step (b) with one or more compounds of the formula:

5.2.2 Ionized Polyolefins

Ionized polyolefins may be made by any method known to those of skill in the art. Examples include, but are not limited to, ionizing a tert-halide with a Lewis acid; ionizing a preformed polyolefin with a Lewis acid in the presence of a proton source; polymerizing an olefin monomer under quasiliving carbocationic polymerization conditions; or performing the "inifer" method.

In some embodiments, the ionized polyolefin is a carbocation terminated polyolefin. In some embodiments, the ionized polyolefin contains one or more carbocation end groups. In some embodiments, the ionized polyolefin contains one carbocation end group. In some embodiments, the ionized polyolefin contains two carbocation end groups. In some embodiments, the ionized polyolefin contains three carbocation end groups. In some embodiments, the ionized polyolefin is a polyisobutylene with a cationic end group. In some embodiments, the ionized polyolefin is a compound of the following formula:

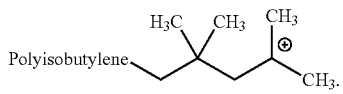

(a) Ionized Polyolefins from Tert-Halides

In some embodiments, the ionized polyolefin is derived from a tert-halide terminated polyolefin. In some embodiments, the ionized polyolefin is derived form a tert-chloride terminated polyolefin, tert-bromide terminated polyolefin, or tert-iodide terminated polyolefin. In some embodiments, the ionized polyolefin is derived from a tert-chloride terminated polyolefin or tert-bromide terminated polyolefin. In some embodiments, the ionized polyolefin is derived from tert-chloride terminated polyisobutylene of the following formula:

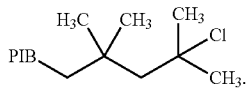

Tert-halide terminated polyolefins may be made by any method known to those of skill in the art.

In some embodiments, the ionized polyolefin is generated by contacting a tert-halide terminated polyolefin with a Lewis acid. In some embodiments, the ionized polyolefin is generated by contacting a tert-chloride terminated polyolefin, tert-bromide terminated polyolefin, or tert-iodide terminated polyolefin with a Lewis acid. In some embodiments, the ionized polyolefin is generated by contacting a tert-chloride terminated polyolefin with a Lewis acid.

In some embodiments, the tert-halide is derived from an inifer (b) Ionized Polyolefins from Preformed Polyolefins In some embodiments, the ionized polyolefin is derived from a preformed polyolefin. In some embodiments, such preformed polyolefin contains one or more double bonds. In some embodiments, such preformed polyolefin contains one double bond. In some embodiments, such preformed polyolefin is a polyisobutylene derivative. In some embodiments, such preformed polyolefin contains one or more endo olefins.

In some embodiments, the ionized polyolefin is generated by contacting a proton source with a preformed polyolefin in the presence of a Lewis acid. In some embodiments, the ionized polyolefin is generated by contacting a preformed polyolefin containing one or more double bonds with a proton source in the presence of a Lewis acid. In some embodiments, the ionized polyolefin is generated by contacting a preformed polyolefin containing one double bond with a proton source in the presence of a Lewis acid. In some embodiments, the ionized polyolefin is generated by contacting a polyisobutylene derivative with a proton source in the presence of a Lewis acid. In some embodiments, the ionized polyolefin is generated by contacting a preformed polyolefin containing one or more endo olefins with a proton source in the presence of a Lewis acid.

(c) Ionized Polyolefins from the Inifer Method

In some embodiments, the ionized polyolefin is derived from an inifer using methods known to those of skill in the art. Non-limiting examples of such methods are described in U.S. Pat. Nos. 4,276,394 and 4,568,732, each of which is incorporated by reference herein. In some embodiments, a monomer is reacted with an inifer carrying at least two tertiary halogens under cationic polymerization conditions. In some embodiments, the inifer is a binifer or a trinifer. In some embodiments, the inifer is tricumyl chloride, paradicumyl chloride, or tricumyl bromide.

(d) Ionized Polyolefins from Olefinic Monomers Under Quasiliving Carbocationic Polymerization Conditions In some embodiments, the ionized polyolefin is derived from olefinic monomers under quasi-living carbocationic conditions. Under such conditions, a quasi-living carbocationic polyolefin is generated. Such conditions may be achieved by any quasiliving method known to those of skill in the art. In some embodiments, a monomer, an initiator, and a Lewis acid are used. In some embodiments, an electron donor, common ion salt, and/or common ion salt precursor is/are used. Non-limiting examples of such methods are described in EP 206756 B1 and WO 2006/110647 A1, both of which are incorporated by reference herein.

In some embodiments, the ionized polyolefin is a quasi-living carbocationic polyisobutylene of the following formula:

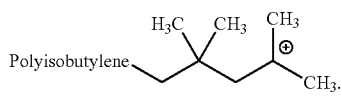

Some non-limiting examples of reagents and conditions suitable for polymerizations producing quasi-living polyolefins will be described below.

(i) Initiators

In some embodiments, the initiator is a compound or polyolefin with one, or more than one, end group capable of initiating a cationic olefin polymerization. For example, the initiator can be a compound of formula $(X'—CR_aR_b)_nR_c$ wherein $R_a$ and $R_b$ are independently hydrogen, alkyl, aryl, alkaryl, or aralkyl, provided that at least one of $R_a$ or $R_b$ is not hydrogen; and $R_c$ has a valence of n, and n is an integer of one to 4. X' is an acetate, etherate, hydroxyl group, or a halogen. In some embodiments, $R_a$, $R_b$ and $R_c$ are hydrocarbon groups containing one carbon atom to about 20 carbon atoms. In some embodiments, $R_a$, $R_b$ and $R_c$ are hydrocarbon groups containing one carbon atom to about 8 carbon atoms. In some embodiments, X' is a halogen. In some embodiments, X' is chloride. In some embodiments, the structure of $R_a$, $R_b$ and $R_c$ mimics the growing species or monomer. In some embodiments, such structure is a 1-halo, 1-phenylethane initiator for polystyrene or a 2,4,4-trimethyl pentyl halide initiator for polyisobutylene. In some embodiments, $R_a$, $R_b$ and $R_c$ are each hydrocarbon groups containing one carbon atom to about 8 carbon atoms for the initiation of an isobutylene polymerization. In some embodiments, the initiator is a cumyl, dicumyl or tricumyl halide.

Some exemplary initiators include 2-chloro-2-phenylpropane, i.e., cumyl chloride; 1,3-di-(2-chloro-2-propyl)benzene or 1,4-di-(2-chloro-2-propyl)benzene, i.e., collectively dicumylchloride; 1,3,5-tri(2-chloro-2-propyl)benzene, i.e., tri(cumylchloride); 2,4,4-trimethyl-2-chloropentane; 2-acetoxy-2-phenylpropane, i.e., cumyl acetate; 2-propionyl-2-phenyl propane, i.e., cumyl propionate; 2-methoxy-2-phenylpropane, i.e., cumylmethyl ether; 1,4-di(2-methoxy-2-propyl)benzene, i.e., di(cumylmethyl ether); 1,3,5-tri(2-methoxy-2-propyl)benzene, i.e., tri(cumylmethyl ether); 2-chloro-2,4,4-trimethyl pentane (TMPCl); 1,3-di(2-chloro-2-propyl)benzene; and 1,3,-di(2-chloro-2-propyl)-5-tert-butylbenzene (bDCC).

In some embodiments, the initiator can be mono-functional, bi-functional, or multi-functional. Some examples of mono-functional initators include 2-chloro-2-phenylpropane, 2-acetoxy-2-phenylpropane, 2-propionyl-2-phenylpropane, 2-methoxy-2-phenylpropane, 2-ethoxy-2-phenylpropane, 2-chloro-2,4,4-trimethylpentane, 2-acetoxy-2,4,4,-trimethylpentane, 2-propionyl-2,4,4-trimethylpentane, 2-methoxy-2,4,4-trimethylpentane, 2-ethoxy-2,4,4-trimethylpentane, and 2-chloro-2,4,4-trimethylpentane. Some examples of bi-functional initiators include 1,3-di(2-chloro-2-propyl)benzene, 1,3-di(2-methoxy-2-propyl)benzene, 1,4-di(2-chloro-2-propyl)benzene, 1,4-di(2-methoxy-2-propyl)benzene, and 5-tert-butyl-1,3,-di(2-chloro-2-propyl)benzene. Some examples of multi-functional initiators include 1,3,5-tri(2-chloro-2-propyl)benzene and 1,3,5-tri(2-methoxy-2-propyl)benzene. In some embodiments, the initiator is 2-chloro-2,4,4-trimethylpentane, 1,3-di(2-chloro-2-propyl)-5-tert-butylbenzene, or dicumyl chloride. In some embodiments, the initiator is 2-chloro-2,4,4-trimethylpentane.

(ii) Monomers

In some embodiments, the monomer is a hydrocarbon monomer, i.e., a compound containing only hydrogen and carbon atoms, including but not limited to, olefins and diolefins, and those having from about 2 to about 20 carbon atoms, e.g., from about 4 to about 8 carbon atoms. Some exemplary monomers include isobutylene, styrene, beta pinene, isoprene, butadiene, 2-methyl-1-butene, 3-methyl-1-butene, and 4-methyl-1-pentene. In some embodiments, the monomer is isobutylene or styrene. In some embodiments, the monomer is isobutylene. In some embodiments, the monomer is styrene.

In some embodiments, a mixture of monomers is used. In some embodiments, a mixture of 2 or more monomers is used. In some embodiments, a mixture of 2 monomers is used. In some embodiments, a mixture of 3 monomers is used. In some embodiments, a mixture of 4 monomers is used.

In some embodiments, the monomers are polymerized to produce polymers of different, but substantially uniform molecular weights. In some embodiments, the molecular weight of the polymer is from about 300 to in excess of a million g/mol. In some embodiments, such polymers are low molecular weight liquid or viscous polymers having a molecular weight of from about 200 to 10,000 g/mol, or solid waxy to plastic, or elastomeric materials having molecular weights of from about 100,000 to 1,000,000 g/mol, or more.

(iii) Lewis Acids

In the methods provided herein, in some embodiments, the Lewis acid is a non-protic acid, e.g., a metal halide or non-metal halide.

Some examples of metal halide Lewis acids include a titanium (IV) halide, a zinc (II) halide, a tin (IV) halide, and an aluminum (III) halide, e.g., titanium tetrabromide, titanium tetrachloride, zinc chloride, $AlBr_3$, and alkyl aluminum halides such as ethyl aluminum dichloride and methyl aluminum bromide. Some examples of non-metal halide Lewis Acids include an antimony (VI) halide, a gallium (III) halide, or a boron (III) halide, e.g., boron trichloride, or a trialkyl aluminum compound such as trimethyl aluminum.

Mixtures of two, or more than two, Lewis acids can also used. In one example, a mixture of an aluminum (III) halide and a trialkyl aluminum compound is used. In some embodiments, the stoichiometric ratio of aluminum (III) halide to trialkyl aluminum is greater than 1, while in other embodiments, the stoichiometric ratio of aluminum (III) halide to trialkyl aluminum is less than 1. For example, a stoichiometric ratio of about 1:1 aluminum (III) halide to trialkyl aluminum compound; a stoichiometric ratio of 2:1 aluminum (III) halide to trialkyl aluminum compound; or a stoichiometric ratio of 1:2 aluminum (III) halide to trialkyl aluminum can be used. In another example, a mixture of aluminum tribromide and trimethyl aluminum is used.

In some embodiments, the Lewis acid can be added in a suitable number of aliquots, e.g., in one aliquot or more than one aliquot, e.g., two aliquots.

(iv) Electron Donors

As is understood to one of ordinary skill in the art, some electron donors are capable of converting traditional polymerization systems into quasiliving polymerization systems. In some embodiments, the methods described herein are performed in the presence of an electron donor.

In some embodiments, the electron donor is capable of complexing with Lewis acids. In some embodiments, the electron donor is a base and/or nucleophile. In some embodiments, the electron donor is capable of abstracting or removing a proton. In some embodiments, the electron donor is an organic base. In some embodiments, the electron donor is an amide. In some embodiments, the electron donor is N,N-dimethylformamide, N,N-dimethylacetamide, or N,N-diethylacetamide. In some embodiments, the electron donor is a sulfoxide. In some embodiments, the electron donor is dimethyl sulfoxide. In some embodiments, the electron donor is an ester. In some embodiments, the electron donor is methyl acetate or ethyl acetate. In some embodiments, the electron donor is a phosphate compound. In some embodiments, the electron donor is trimethyl phosphate, tributyl phosphate, or triamide hexamethylphosphate. In some embodiments, the electron donor is an oxygen-containing metal compound. In some embodiments, the electron donor is tetraisopropyl titanate.

In some embodiments, the electron donor is pyridine or a pyridine derivative. In some embodiments, the electron donor is a compound of formula:

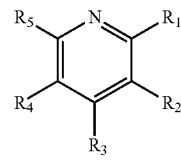

wherein $R_1$, $R_2$, $R_3$, $R_4$, and $R_5$ are each, independently, hydrogen or hydrocarbyl; or $R_1$ and $R_2$, or $R_2$ and $R_3$, or $R_3$ and $R_4$, or $R_4$ and $R_5$ independently form a fused aliphatic ring of about 3 to about 7 carbon atoms or a fused aromatic ring of about 5 to about 7 carbon atoms. In some embodiments, $R_1$ and $R_5$ are each, independently, hydrocarbyl, and $R_2$-$R_4$ are hydrogen.

In some embodiments, the electron donor is 2,6-di-tert-butylpyridine, 2,6-lutidine, 2,4-dimethylpryidine, 2,4,6-trimethylpyridine, 2-methylpyridine, or pyridine.

(v) Common Ion Salts and Ion Salt Precursors

In some embodiments, common ion salts or salt precursors may be optionally added to the reaction mixture in addition to or in replacement of the electron donor. In some embodiments, such salts may be used to increase the ionic strength, suppress free ions, and interact with ligand exchange. In some embodiments, the common ion salt precursor is tetra-n-butylammonium chloride. In some embodiments, the common ion salt precursor is tetra-n-butylammonium iodide In some embodiments, the concentration of the common ion salts or salt precursors in the total reaction mixture may be in the range from about 0.0005 moles per liter to about 0.05 moles per liter. In some embodiments, the concentration of the common ion salts or salt precursors is in the range from about 0.0005 moles per liter to about 0.025 moles per liter. In some embodiments, the concentration of the common ion salt or salt precursors is in the range from about 0.001 moles per liter to about 0.007 moles per liter.

5.2.3 Preparation of Vinylidene-Terminated Polyolefins

In some embodiments, provided herein are methods for preparing a vinylidene terminated polyolefin comprising:

a. ionizing a polyolefin in the presence of a Lewis acid or mixture of Lewis acids to form an ionized polyolefin;

b. reacting the ionized polyolefin from step (a) with one or more disulfides to form an intermediate; and c. reacting the intermediate of step (b) with one or more alcohols or amines.

In some embodiments, the vinylidene terminated polyolefin is a vinylidene terminated polyisobutylene.

(a) Disulfides

In some embodiments, more than one disulfide is used. In some embodiments, one disulfide is used.

In some embodiments, the disulfide is a compound of the formula:

wherein $R^A$ and $R^B$ are each, independently, alkyl, aryl, aralkyl, alkaryl,

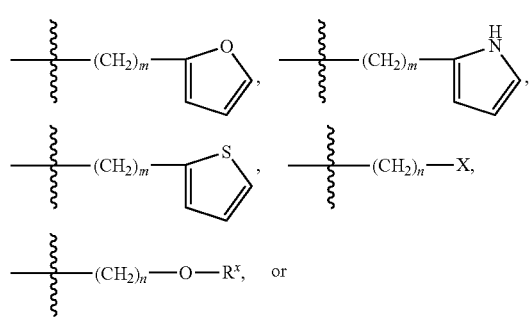

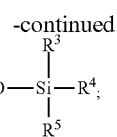

wherein m is 1-3; n is 1-3; p is 1-3;

X is halo or a pseudohalide;

$R^x$ is alkyl, aryl, aralkyl, or alkaryl;

$R^3$ is tert-butyl; and $R^4$ and $R^5$ are each, independently, alkyl, aryl, aralkyl, or alkaryl.

In some embodiments, the disulfide is a compound of the formula:

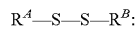

wherein $R^A$ and $R^B$ are each, independently, alkyl, aryl, alkaryl,

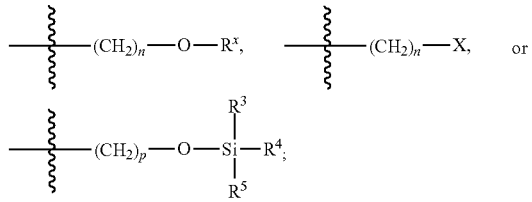

wherein n is 1-3; p is 1-3;

X is halo;

$R^3$ is tert-butyl;

$R^4$ and $R^5$ are each, independently, aryl or alkyl; and $R^x$ is alkyl or aryl.

In some embodiments, $R^A$ and $R^B$ are identical.

In some embodiments, $R^A$ and $R^B$ are alkyl, aryl or alkaryl.

In some embodiments, $R^A$ and $R^B$ are alkyl.

In some embodiments, $R^A$ and $R^B$ are alkyl of 1 to about 10 carbons.

In some embodiments, $R^A$ and $R^B$ are methyl, ethyl, propyl, tert-butyl, isopropyl, phenyl, or tolyl.

In some embodiments, $R^A$ and $R^B$ are methyl, ethyl, tert-butyl, isopropyl, or tolyl.

In some embodiments, $R^A$ and $R^B$ are ethyl, tert-butyl, isopropyl, or tolyl.

In some embodiments, $R^A$ and $R^B$ are isopropyl or tert-butyl.

In some embodiments, $R^A$ and $R^B$ are isopropyl.

In some embodiments, $R^A$ and $R^B$ are tert-butyl.

In some embodiments, $R^A$ and $R^B$ are

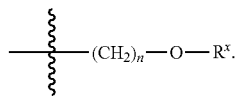

In further embodiments, n is 1-2. In further embodiments, n is 1. In further embodiments, $R^x$ is alkyl. In further embodiments, $R^x$ is aryl.

In some embodiments, $R^A$ and $R^B$ are

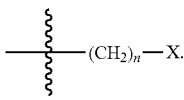

In further embodiments, n is 1. In further embodiments, n is 2. In further embodiments, n is 3.

In further embodiments, X is F, Cl, or Br. In further embodiments, X is Cl or Br. In further embodiments, X is Cl. In further embodiments, X is Br.

In some embodiments, $R^A$ and $R^B$ are

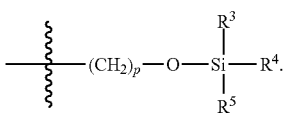

In further embodiments, p is 1. In further embodiments, p is 2. In further embodiments, p is 3.

In further embodiments, $R^4$ and $R^5$ are identical.

In further embodiments, $R^4$ and $R^5$ are aryl. In further embodiments, $R^4$ and $R^5$ are alkyl. In certain embodiments, $R^4$ and $R^5$ are tertiary alkyl.

In some embodiments, $R^4$ and $R^5$ are phenyl or methyl. In some embodiments, $R^4$ and $R^5$ are phenyl.

(b) Alcohols

In some embodiments, the intermediate of step (b) is reacted with one or more alcohols. In some embodiments, more than one alcohol is used. In some embodiments, one alcohol is used.

In some embodiments, the alcohol is a compound of the formula:

R—OH;

wherein R is alkyl of 1-8 carbons.

In some embodiments, the alkyl is a straight hydrocarbon chain.

In some embodiments, the alcohol is methanol, ethanol, isopropanol, 2-ethylhexanol, or sec-butanol.

In some embodiments, the alcohol is ethanol, isopropanol, 2-ethylhexanol, or sec-butanol.

In some embodiments, the alcohol is methanol or isopropanol

In some embodiments, the alcohol is methanol.

(c) Amines

In some embodiments, the intermediate of step (b) is reacted with one or more amines. In some embodiments, more than one amine is used. In some embodiments, one amine is used.

In some embodiments, the amine is n-butylamine, 2-ethylhexylamine, tert-amylamine, triethylamine, or dibutylamine.

(d) Product Distribution

In some embodiments, the methods described herein selectively provide vinylidene-terminated polyolefins. In some embodiments, vinylidene-terminated polyolefins, polyolefins containing endo olefins, tert-halide polyolefins, coupled polyolefins, and sulfide-terminated polyolefins are reaction products. In some embodiments, vinylidene terminated polyolefins are the major products, and polyolefins containing endo olefins, tert-halide polyolefins, coupled polyolefins, and sulfide-terminated polyolefins are the minor products.

In some embodiments, the vinylidene terminated polyolefin formed is at least 10 mole percent of all products. In some embodiments, the vinylidene terminated polyolefin formed is at least 20 mole percent of all products. In some embodiments, the vinylidene terminated polyolefin formed is at least 40 mole percent of all products. In some embodiments, the vinylidene terminated polyolefin formed is at least 60 mole percent of all products. In some embodiments, the vinylidene terminated polyolefin formed is at least 70 mole percent of all products. In some embodiments, the vinylidene terminated polyolefin formed is at least 80 mole percent of all products. In some embodiments, the vinylidene terminated polyolefin formed is at least 85 mole percent of all products.

In some embodiments, the vinylidene terminated polyolefin formed is at most 10 mole percent of all products. In some embodiments, the vinylidene terminated polyolefin formed is at most 20 mole percent of all products. In some embodiments, the vinylidene terminated polyolefin formed is at most 40 mole percent of all products. In some embodiments, the vinylidene terminated polyolefin formed is at most 60 mole percent of all products. In some embodiments, the vinylidene terminated polyolefin formed is at most 70 mole percent of all products. In some embodiments, the vinylidene terminated polyolefin formed is at most 80 mole percent of all products. In some embodiments, the vinylidene terminated polyolefin formed is at most 85 mole percent of all products.

5.2.4 Preparation of Sulfide-Terminated Polyolefins (a) Preparation of Sulfide-Terminated Polyolefins Via Termination Reaction with Alcohols or Amines.

In some embodiments, provided herein are methods for preparing a sulfide-terminated polyolefin of the formula:

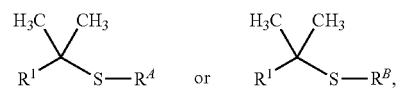

or a mixture thereof;

wherein $R^1$ is a polyolefin group;

$R^A$ and $R^B$ are each, independently, alkyl, aryl, aralkyl, alkaryl,

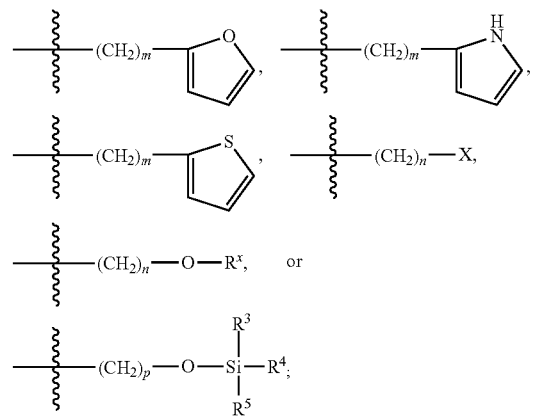

wherein m is 1-3; n is 1-3; p is 1-3;

X is halo or a pseudohalide;

$R^x$ is alkyl or aryl;

$R^3$ is tert-butyl; and $R^4$ and $R^5$ are each, independently, alkyl, aryl, aralkyl, or alkaryl, comprising a. ionizing a polyolefin in the presence of a Lewis acid or mixture of Lewis acids to form an ionized polyolefin;
b. reacting the ionized polyolefin from step (a) with one or more compounds of the formula:

to form an intermediate; and
c. reacting the intermediate of step (b) with one or more alcohols or amines.

In some embodiments, provided herein are methods for preparing a sulfide-terminated polyolefin of the formula:

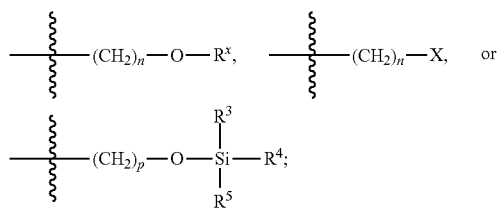

or a mixture thereof;
wherein $R^1$ is a polyolefin group;
$R^A$ and $R^B$ are each, independently, alkyl, aryl, alkaryl,

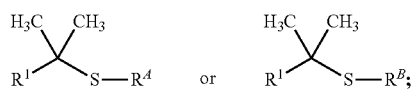

wherein n is 1-3; p is 1-3;
X is halo or a pseudohalide;
$R^3$ is tert-butyl;
$R^4$ and $R^5$ are each, independently, aryl or alkyl; and
$R^x$ is alkyl or aryl, comprising:
a. ionizing a polyolefin in the presence of a Lewis acid or mixture of Lewis acids to form an ionized polyolefin;
b. reacting the ionized polyolefin from step (a) with one or more compounds of the formula:

to form an intermediate; and
c. reacting the intermediate of step (b) with one or more alcohols or amines.

In some embodiments, $R^1$ is a polyisobutylene group.

(i) Disulfides

In some embodiments, more than one compound of the formula $R^A$—S—S—$R^B$ is used. In some embodiments, one compound of the formula $R^A$—S—S—$R^B$ is used.

In some embodiments, $R^A$ and $R^B$ are identical.

In some embodiments, $R^A$ and $R^B$ are alkyl or alkaryl. In some embodiments, $R^A$ and $R^B$ are alkyl. In some embodiments, $R^A$ an $R^B$ are alkyl of 1 to about 10 carbons.

In some embodiments, $R^A$ and $R^B$ are methyl, ethyl, propyl, isopropyl, phenyl, or tolyl.

In some embodiments, $R^A$ and $R^B$ are methyl, ethyl, isopropyl, or tolyl.

In some embodiments, $R^A$ and $R^B$ are isopropyl or tolyl.
In some embodiments, $R^A$ and $R^B$ are isopropyl.
In some embodiments, $R^A$ and $R^B$ are tolyl.
In some embodiments, $R^A$ and $R^B$ are

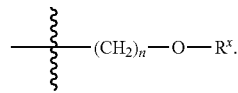

In further embodiments, n is 1-2. In further embodiments, n is 1.

In some embodiments, $R^x$ is alkyl. In some embodiments, $R^x$ is aryl.

In some embodiments, $R^A$ and $R^B$ are

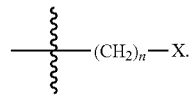

In further embodiments, n is 1. In further embodiments, n is 2. In further embodiments, n is 3.

In further embodiments, X is F, Cl, or Br. In further embodiments, X is Cl or Br. In further embodiments, X is Cl. In further embodiments, X is Br.

In some embodiments, $R^A$ and $R^B$ are

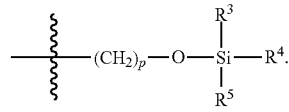

In further embodiments, p is 1. In further embodiments, p is 2. In further embodiments, p is 3.

In further embodiments, $R^4$ and $R^5$ are identical.
In further embodiments, $R^4$ and $R^5$ are aryl. In further embodiments, $R^4$ and $R^5$ are alkyl. In certain embodiments, $R^4$ and $R^5$ are tertiary alkyl.

In some embodiments, $R^4$ and $R^5$ are phenyl or methyl. In some embodiments, $R^4$ and $R^5$ are phenyl.

(ii) Alcohols

In some embodiments, the intermediate of step (b) is reacted with one or more alcohols. In some embodiments, one alcohol is used. In some embodiments, more than one alcohol is used.

In some embodiments, the alcohol is

wherein R is alkyl of 1-8 carbons.

In some embodiments, the alcohol is methanol or isopropanol. In some embodiments, the alcohol is methanol.

(iii) Amines

In some embodiments, the intermediate of step (b) is reacted with one or more amines. In some embodiments, one amine is used. In some embodiments, more than one amine is used.

In some embodiments, the amine is

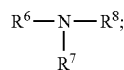

wherein $R^6$ is alkyl; and $R^7$ and $R^8$ are each, independently, hydrogen or alkyl of 1-8 carbons.

In some embodiments, $R^6$ is alkyl of 1-8 carbons. In some embodiments, $R^6$ is butyl,

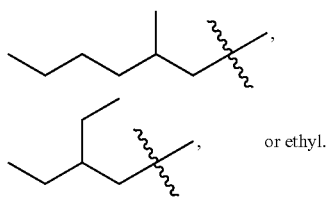 or ethyl.

In some embodiments, $R^6$ is butyl.

In some embodiments, $R^7$ and $R^8$ are hydrogen. In some embodiments, $R^7$ is hydrogen.

In some embodiments, $R^7$ and $R^8$ are each, independently, alkyl of 1-8 carbons.

In some embodiments, $R^6$, $R^7$, and $R^8$ are identical. In some embodiments, $R^7$ and $R^8$ are identical.

In some embodiments, $R^7$ is methyl, ethyl, or butyl. In some embodiments, $R^7$ is methyl. In some embodiments, $R^7$ is ethyl. In some embodiments, $R^7$ is butyl.

In some embodiments, $R^8$ is methyl, ethyl, or butyl. In some embodiments, $R^8$ is methyl. In some embodiments, $R^8$ is ethyl. In some embodiments, $R^8$ is butyl.

In some embodiments, the amine is n-butylamine, 2-ethylhexylamine, tert-amylamine, triethylamine, or dibutylamine. In some embodiments, the amine is triethylamine.

(iv) Product Distribution

In some embodiments, the methods described herein selectively provide sulfide-terminated polyolefins of the formula:

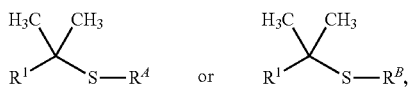

or a mixture thereof.

In some embodiments, vinylidene-terminated polyolefins, polyolefins containing endo olefins, tert-halide polyolefins, coupled polyolefins, and sulfide-terminated polyolefins are reaction products. In some embodiments, sulfide-terminated polyolefins are the major products, and polyolefins containing endo olefins, tert-halide polyolefins, coupled polyolefins, and vinylidene-terminated polyolefins are the minor products.

In further embodiments, the sulfide terminated polyolefins formed are at least 10 mole percent of all products. In some embodiments, the sulfide terminated polyolefins formed are at least 20 mole percent of all products. In some embodiments, the sulfide terminated polyolefins formed are at least 40 mole percent of all products. In some embodiments, the sulfide terminated polyolefins formed are at least 60 mole percent of all products. In some embodiments, the sulfide terminated polyolefins formed are at least 70 mole percent of all products. In some embodiments, the sulfide terminated polyolefins formed are at least 80 mole percent of all products. In some embodiments, the sulfide terminated polyolefins formed are at least 85 mole percent of all products. In some embodiments, the sulfide terminated polyolefins formed are at least 90 mole percent of all products. In some embodiments, the sulfide terminated polyolefins formed are at least 95 mole percent of all products.

In further embodiments, the sulfide terminated polyolefins formed are at most 10 mole percent of all products. In some embodiments, the sulfide terminated polyolefins formed are at most 20 mole percent of all products. In some embodiments, the sulfide terminated polyolefins formed are at most 40 mole percent of all products. In some embodiments, the sulfide terminated polyolefins formed are at most 60 mole percent of all products. In some embodiments, the sulfide terminated polyolefins formed are at most 70 mole percent of all products. In some embodiments, the sulfide terminated polyolefins formed are at most 80 mole percent of all products. In some embodiments, the sulfide terminated polyolefins formed are at most 85 mole percent of all products. In some embodiments, the sulfide terminated polyolefins formed are at most 90 mole percent of all products. In some embodiments, the sulfide terminated polyolefins formed are at most 95 mole percent of all products.

(b) Preparation of Sulfide-Terminated Polyolefins Via Termination Reaction with Thiols (i) Sulfide-Terminated Polyolefins Via Disulfide Addition In some embodiments, provided herein are methods for preparing a sulfide-terminated polyolefin of the formula:

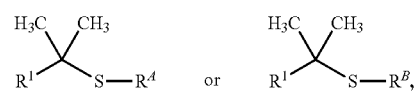

or a mixture thereof;
  wherein $R^1$ is a polyolefin group;
    $R^A$ and $R^B$ are each, independently, alkyl, aryl, aralkyl, alkaryl,

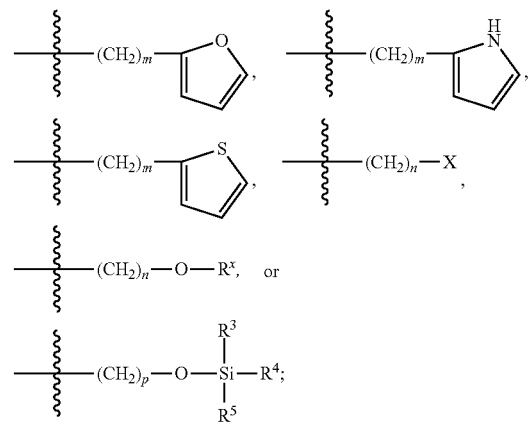

wherein m is 1-3; n is 1-3; p is 1-3;
    X is halo or a pseudohalide;
    $R^x$ is alkyl or aryl;
    $R^3$ is tert-butyl; and
    $R^4$ and $R^5$ are each, independently, alkyl, aryl, aralkyl, or alkaryl, comprising
  a. ionizing a polyolefin in the presence of a Lewis acid or mixture of Lewis acids to form an ionized polyolefin;
  b. reacting the ionized polyolefin from step (a) with one or more compounds of the formula:

$R^A$—S—S—$R^B$ to form an intermediate; and
  c. reacting the intermediate of step (b) with one or more thiols.

In some embodiments, provided herein are methods for preparing a sulfide-terminated polyolefin of the formula:

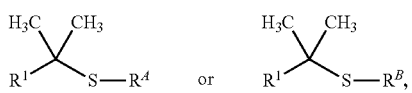

or a mixture thereof;
wherein $R^1$ is a polyolefin group;
$R^A$ and $R^B$ are each, independently, alkyl, aryl, alkaryl,

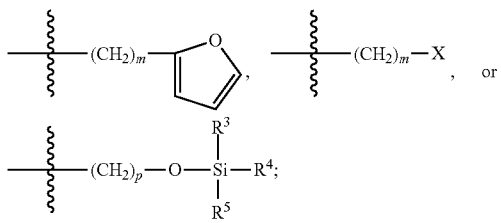

wherein m is 1-3; n is 1-3; p is 1-3;
X is halo;
$R^3$ is tert-butyl; and
$R^4$ and $R^5$ are each, independently, aryl or alkyl; comprising:
a. ionizing a polyolefin in the presence of a Lewis acid or mixture of Lewis acids to form an ionized polyolefin;
b. reacting the ionized polyolefin from step (a) with one or more compounds of the formula:

$$R^A—S—S—R^B$$

to form an intermediate; and
c. reacting the intermediate of step (b) with one or more thiols.

In some embodiments, $R^1$ is a polyisobutylene group.

1. Disulfides

In some embodiments, one compound of the formula $R^A$—S—S—$R^B$ is used. In some embodiments, more than one compound of the formula $R^A$—S—S—$R^B$ is used.

In some embodiments, $R^A$ and $R^B$ are identical.

In some embodiments, $R^A$ and $R^B$ are alkyl or alkaryl. In some embodiments, $R^A$ and $R^B$ are alkyl. In some embodiments, $R^A$ and $R^B$ are alkyl of 1 to about 10 carbons.

In some embodiments, $R^A$ and $R^B$ are methyl, ethyl, propyl, isopropyl, phenyl, or tolyl.

In some embodiments, $R^A$ and $R^B$ are methyl, ethyl, isopropyl, or tolyl.

In some embodiments, $R^A$ and $R^B$ are isopropyl or tolyl.

In some embodiments, $R^A$ and $R^B$ are isopropyl.

In some embodiments, $R^A$ and $R^B$ are tolyl.

In some embodiments, $R^A$ and $R^B$ are

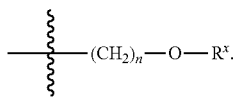

In further embodiments, n is 1-2. In further embodiments, n is 1

In some embodiments, $R^x$ is alkyl. In some embodiments, $R^x$ is aryl.

In some embodiments, $R^A$ and $R^B$ are

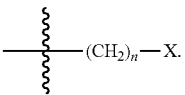

In further embodiments, n is 1. In further embodiments, n is 2. In further embodiments, n is 3.

In further embodiments, X is F, Cl, or Br. In further embodiments, X is Cl or Br. In further embodiments, X is Cl. In further embodiments, X is Br.

In some embodiments, $R^A$ and $R^B$ are

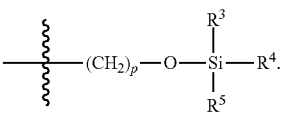

In further embodiments, p is 1. In further embodiments, p is 2. In further embodiments, p is 3.

In further embodiments, $R^4$ and $R^5$ are identical.

In further embodiments, $R^4$ and $R^5$ are aryl. In further embodiments, $R^4$ and $R^5$ are alkyl. In certain embodiments, $R^4$ and $R^5$ are tertiary alkyl.

In some embodiments, $R^4$ and $R^5$ are phenyl or methyl. In some embodiments, $R^4$ and $R^5$ are phenyl.

2. Thiols

In some embodiments, one thiol is used. In some embodiments, more than one thiol is used.

In some embodiments, the thiol has the formula $R^{C1}$—SH; wherein $R^{C1}$ is alkyl, aryl, aralkyl, alkaryl, substituted alkyl, or substituted aryl.

In some embodiments, the $R^{C1}$ is alkyl of 1-6 carbon atoms. In some embodiments, the $R^{C1}$ is alkyl of 1-3 carbon atoms.

In some embodiments, the thiol is ethanethiol or n-propanethiol.

In some embodiments, the disulfide is diisopropyldisulfide and the thiol is ethanethiol. In some embodiments, the disulfide is ditolyldisulfide and the thiol is n-propanethiol.

3. Product Distribution

In some embodiments, the methods described herein selectively provide sulfide-terminated polyolefins of the formula:

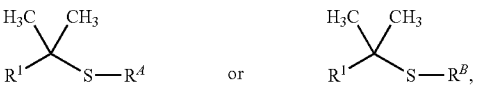

or a mixture thereof.

In some embodiments, vinylidene-terminated polyolefins, polyolefins containing endo olefins, tert-halide polyolefins, coupled polyolefins, sulfide-terminated polyolefins derived from disulfide addition, and sulfide-terminated polyolefins derived from thiol addition are reaction products. In some embodiments, sulfide-terminated polyolefins, wherein the sulfide moiety is derived from the disulfide reagent, are the major products. Polyolefins containing endo olefins, tert-halide polyolefins, coupled polyolefins, vinylidene-terminated polyolefins, and sulfide-terminated polyolefins, wherein the sulfide moiety is derived from the thiol addition, are the minor products.

In some embodiments, the sulfide terminated polyolefins derived from disulfide addition formed is at least 10 mole percent of all products. In some embodiments, the sulfide terminated polyolefins derived from disulfide addition formed is at least 20 mole percent of all products. In some embodiments, the sulfide terminated polyolefins derived from disulfide addition formed is at least 40 mole percent of all products. In some embodiments, the sulfide terminated polyolefins derived from disulfide addition formed is at least 60 mole percent of all products. In some embodiments, the sulfide terminated polyolefins derived from disulfide addition formed is at least 70 mole percent of all products. In some embodiments, the sulfide terminated polyolefins derived from disulfide addition formed is at least 80 mole percent of all products. In some embodiments, the sulfide terminated polyolefins derived from disulfide addition formed is at least 85 mole percent of all products.

In some embodiments, the sulfide terminated polyolefins derived from disulfide addition formed is at most 10 mole percent of all products. In some embodiments, the sulfide terminated polyolefins derived from disulfide addition formed is at most 20 mole percent of all products. In some embodiments, the sulfide terminated polyolefins derived from disulfide addition formed is at most 40 mole percent of all products. In some embodiments, the sulfide terminated polyolefins derived from disulfide addition formed is at most 60 mole percent of all products. In some embodiments, the sulfide terminated polyolefins derived from disulfide addition formed is at most 70 mole percent of all products. In some embodiments, the sulfide terminated polyolefins derived from disulfide addition formed is at most 80 mole percent of all products. In some embodiments, the sulfide terminated polyolefins derived from disulfide addition formed is at most 85 mole percent of all products.

(ii) Sulfide-Terminated Polyolefins Via Thiol Addition

In certain embodiments, provided herein are methods for preparing a sulfide-terminated polyolefin of the formula:

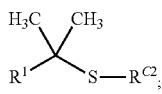

wherein $R^1$ is a polyolefin group; and
$R^{C2}$ is alkyl, aryl, aralkyl, alkaryl, substituted alkyl, or substituted aryl; comprising:
a. ionizing a polyolefin in the presence of a Lewis acid or mixture of Lewis acids to form an ionized polyolefin;
b. reacting the ionized polyolefin with one or more compounds of the formula:

to form an intermediate;
wherein $R^A$ and $R^B$ are each, independently, alkyl, aryl, aralkyl, or alkaryl; and
c. reacting the intermediate from step (b) with one or more compounds of the formula $R^{C2}$—SH.

In some embodiments, $R^1$ is a polyisobutylene group.

1. Disulfides

In some embodiments, one compound of the formula $R^A$—S—S—$R^B$ is used. In some embodiments, more than one compound of the formula $R^A$—S—S—$R^B$ is used.

In some embodiments, $R^A$ and $R^B$ are each, independently, alkyl, aryl, aralkyl, alkaryl,

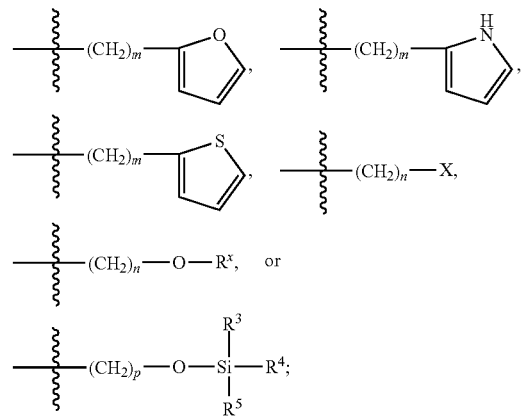

wherein m is 1-3; n is 1-3; p is 1-3;
X is halo or a pseudohalide;
$R^x$ is alkyl or aryl;
$R^3$ is tert-butyl; and
$R^4$ and $R^5$ are each, independently, alkyl, aryl, aralkyl, or alkaryl.

In some embodiments, $R^A$ and $R^B$ are each, independently, alkyl, aryl, alkaryl,

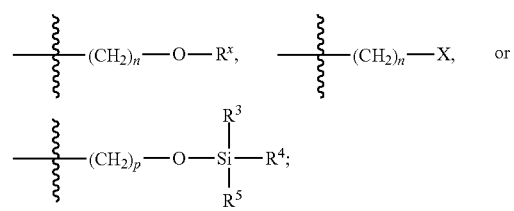

wherein n is 1-3; p is 1-3;
X is halo;
$R^3$ is tert-butyl;
$R^4$ and $R^5$ are each, independently, aryl or alkyl; and
$R^x$ is alkyl or aryl.

In some embodiments, $R^A$ and $R^B$ are identical.

In some embodiments, $R^A$ and $R^B$ are alkyl or alkaryl. In some embodiments, $R^A$ and $R^B$ are alkyl.

In some embodiments, $R^A$ and $R^B$ are methyl, ethyl, propyl, tert-butyl, isopropyl, phenyl, or tolyl.

In some embodiments, $R^A$ and $R^B$ are methyl, ethyl, tert-butyl, isopropyl, or tolyl.

In some embodiments, $R^A$ and $R^B$ are isopropyl or tolyl.

In some embodiments, $R^A$ and $R^B$ are isopropyl.

In some embodiments, $R^A$ and $R^B$ are tolyl.

In some embodiments, $R^A$ and $R^B$ are

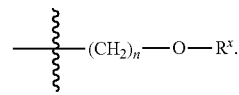

In further embodiments, n is 1-2. In further embodiments, n is 1. In further embodiments, $R^x$ is alkyl. In further embodiments, $R^x$ is aryl.

In some embodiments, $R^A$ and $R^B$ are

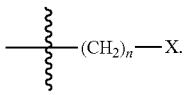

In further embodiments, n is 1. In further embodiments, n is 2. In further embodiments, n is 3.

In further embodiments, X is F, Cl, or Br. In further embodiments, X is Cl or Br. In further embodiments, X is Cl. In further embodiments, X is Br.

In some embodiments, $R^A$ and $R^B$ are

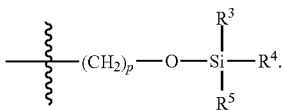

In further embodiments, p is 1. In further embodiments, p is 2. In further embodiments, p is 3.

In further embodiments, $R^4$ and $R^5$ are identical.

In further embodiments, $R^4$ and $R^5$ are aryl. In further embodiments, $R^4$ and $R^5$ are alkyl. In certain embodiments, $R^4$ and $R^5$ are tertiary alkyl.

In some embodiments, $R^4$ and $R^5$ are phenyl or methyl. In some embodiments, $R^4$ and $R^5$ are phenyl.

2. Thiols

In some embodiments, one thiol is used. In some embodiments, more than one thiol is used.

In some embodiments, the thiol has the formula $R^{C2}$—SH; wherein $R^{C2}$ is alkyl, aryl, aralkyl, alkaryl, substituted alkyl, or substituted aryl.

In some embodiments, $R^{C2}$ is alkyl of 1-6 carbons.

In some embodiments, $R^{C2}$ is alkyl of 1-3 carbons.

In some embodiments, the thiol is ethanethiol or n-propanethiol.

In some embodiments, the thiol is n-propanethiol.

In some embodiments, the disulfide is diisopropyldisulfide and the thiol is n-propanethiol.

In some embodiments, the disulfide is diisopropyldisulfide and the thiol ethanethiol.

3. Product Distribution

In some embodiments, the methods described herein selectively provide sulfide-terminated polyolefins of the formula:

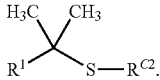

In some embodiments, vinylidene-terminated polyolefins, polyolefins containing endo olefins, tert-halide polyolefins, coupled polyolefins, sulfide-terminated polyolefins derived from disulfide addition, and sulfide-terminated polyolefins derived from thiol addition are reaction products. In some embodiments, sulfide-terminated polyolefins, wherein the sulfide moiety is derived from thiol addition, are the major products. Polyolefins containing endo olefins, tert-halide polyolefins, coupled polyolefins, vinylidene-terminated polyolefins, and sulfide-terminated polyolefins, wherein the sulfide moiety is derived from the disulfide reagent, are the minor products.

In some embodiments, the sulfide terminated polyolefin derived from thiol addition formed is at least 10 mole percent of all products. In some embodiments, the sulfide terminated polyolefin derived from thiol addition formed is at least 20 mole percent of all products. In some embodiments, the sulfide terminated polyolefin derived from thiol addition formed is at least 40 mole percent of all products. In some embodiments, the sulfide terminated polyolefin derived from thiol addition formed is at least 60 mole percent of all products. In some embodiments, the sulfide terminated polyolefin derived from thiol addition formed is at least 70 mole percent of all products. In some embodiments, the sulfide terminated polyolefin derived from thiol addition formed is at least 80 mole percent of all products. In some embodiments, the sulfide terminated polyolefin derived from thiol addition formed is at least 85 mole percent of all products.

In some embodiments, the sulfide terminated polyolefin derived from thiol addition formed is at most 10 mole percent of all products. In some embodiments, the sulfide terminated polyolefin derived from thiol addition formed is at most 20 mole percent of all products. In some embodiments, the sulfide terminated polyolefin derived from thiol addition formed is at most 40 mole percent of all products. In some embodiments, the sulfide terminated polyolefin derived from thiol addition formed is at most 60 mole percent of all products. In some embodiments, the sulfide terminated polyolefin derived from thiol addition formed is at most 70 mole percent of all products. In some embodiments, the sulfide terminated polyolefin derived from thiol addition formed is at most 80 mole percent of all products. In some embodiments, the sulfide terminated polyolefin derived from thiol addition formed is at most 85 mole percent of all products.

5.2.5 Diluents

In some embodiments of the methods described herein, the methods are performed in a diluent. In some embodiments, the diluent is a single compound or a mixture of two or more compounds. In some embodiments, the diluent completely dissolves the reaction components or partially dissolves the reaction components. In some embodiments, the diluent completely or nearly completely dissolves the reaction components. In some embodiments, the diluent completely dissolves the reaction components. In some embodiments, the diluent nearly completely dissolves the reaction components.

In some embodiments, the diluent has a low boiling point and/or low freezing point. In some embodiments, the diluent is a normal alkane. In some embodiments, the diluent is propane, normal butane, normal pentane, normal hexane, normal heptane, normal octane, normal nonane or normal decane. In some embodiments, the diluent is normal hexane or normal pentane. In some embodiments, the diluent is normal hexane. In some embodiments, the diluent is a branched alkane. In some embodiments, the alkane is isobutane, isopentane, neopentane, isohexane, 3-methylpentane, 2,2-dimethylbutane, or 2,3-dimethylbutane. In some embodiments, the alkane is a nitroalkane.

In some embodiments, the diluent is an alkyl halide. In some embodiments, the diluent is an alkyl monohalide or an alkyl polyhalide. In some embodiments, the diluent is chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, iso-propyl chloride, 1,2-dichloropropane, or 1,3-dichloropropane. In some embodiments, the diluent is methylene chloride or methyl chloride. In some embodiments, the diluent is methyl chloride. In some embodiments, the diluent is an alkene or halogenated alkene. In some embodiments, the diluent is vinyl chloride, 1,1-dichloroethene, or 1,2-dichloroethene.

In some embodiments, the diluent is a substituted benzene. In some embodiments, the diluent is benzene. In some embodiments, the diluent is toluene.

In some embodiments, the diluent is carbon disulfide, sulfur dioxide, acetic anhydride, acetonitrile, benzene, toluene, ethylbenzene, methylcyclohexane, chlorobenzene, or a nitroalkane.

In some embodiments, the diluent is a mixture of two or more compounds. In some embodiments, the diluent is a mixture of hexane and methyl chloride. In further embodiments, such mixture is from about 1:9 to about 9:1 hexane:methyl chloride by volume. In further embodiments, such mixture is from about 1:2 to about 2:1 hexane:methyl chloride by volume. In further embodiments, such mixture is from about 1:1.6 to about 1.6:1 hexane:methyl chloride by volume. In further embodiments, such mixture is from about 1:1.4 to about 1.4:1 hexane:methyl chloride by volume. In further embodiments, such mixture is about 1:1 hexane:methyl chloride by volume.

5.2.6 Temperature

In some embodiments, the methods described herein are performed at a temperature from about −120° C. to about 0° C. In some embodiments, the methods described herein are performed at a temperature from about −110° C. to about −10° C. In some embodiments, the methods described herein are performed at a temperature from about −100° C. to about −20° C. In some embodiments, the methods described herein are performed at a temperature from about −90° C. to about −30° C. In some embodiments, the methods described herein are performed at a temperature from about −80° C. to about −40° C. In some embodiments, the methods described herein are performed at a temperature from about −70° C. to about −40° C. In some embodiments, the methods described herein are performed at a temperature from about −60° C. to about −40° C. In some embodiments, the methods described herein are performed at a temperature of −40° C., −45° C., −60° C., or −80° C. In some embodiments, the methods described herein are performed at a temperature of −40° C. In some embodiments, the methods described herein are performed at a temperature of −45° C. In some embodiments, the methods described herein are performed at a temperature of −60° C. In some embodiments, the methods described herein are performed at a temperature of −80° C.

5.2.7 Concentrations

The chain end concentration of the methods described herein are not limited by the disclosed examples. In some embodiments, the chain end concentration is less than 0.010 M. In some embodiments, the chain end concentration is less than 0.050 M. In some embodiments, the chain end concentration is less than 0.10 M. In some embodiments, the chain end concentration is less than 0.5 M. In some embodiments, the chain end concentration is less than 1.0 M. In some embodiments, the chain end concentration is greater than 0.001 M.

In some embodiments, the molar concentration of disulfide is from about 1 to about 10 times the molar concentration of chain ends. In some embodiments, the molar concentration of disulfide is from about 1.1 to about 8 times the molar concentration of chain ends. In some embodiments, the molar concentration of disulfide is from about 1.1 to about 5 times the molar concentration of chain ends. In some embodiments, the molar concentration of disulfide is from about 1.1 to about 4 times the molar concentration of chain ends. In some embodiments, the molar concentration of disulfide is from about 1.1 to about 3 times the molar concentration of chain ends. In some embodiments, the molar concentration of disulfide is from about 1.1 to about 2 times the molar concentration of chain ends.

In some embodiments, the molar concentration of Lewis acid is from about 0.5 to about 20 times the molar concentration of chain ends. In some embodiments, the molar concentration of Lewis acid is from about 0.5 to about 15 times the molar concentration of chain ends. In some embodiments, the molar concentration of Lewis acid is from about 1.0 to about 10 times the molar concentration of chain ends. In some embodiments, the molar concentration of Lewis acid is from about 1.0 to about 8 times the molar concentration of chain ends. In some embodiments, the molar concentration of Lewis acid is from about 2 to about 5 times the molar concentration of chain ends.

In some embodiments, the electron donor concentration is less than half the concentration of Lewis acid. In some embodiments, the electron donor concentration is less than 0.4 times the Lewis acid concentration. In some embodiments, the electron donor concentration is less than 0.3 times the Lewis acid concentration. In some embodiments, the electron donor concentration is less than 0.2 times the Lewis acid concentration. In some embodiments, the electron donor concentration is less than 0.1 times the Lewis acid concentration.

5.3 Compounds

Provided herein are compounds of the formula:

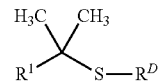

wherein $R^1$ is a polyolefin group; and
$R^D$ is alkyl of 1 to 7 carbons, substituted alkyl, unsubstituted aryl, alkaryl, aralkyl,

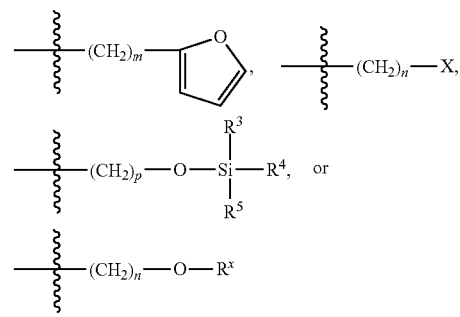

wherein m is 1-3; n is 1-3; p is 1-3;
X is halo or a pseudohalide;
$R^3$ is tert-butyl;
$R^4$ and $R^5$ are each, independently, aryl or alkyl; and
$R^x$ is hydrocarbyl.

In some embodiments, $R^D$ is alkyl of 1 to 7 carbons or substituted alkyl. In some embodiments, $R^D$ is alkyl of 1 to 7 carbons. In some embodiments, $R^D$ is alkyl of 1 carbon. In some embodiments, $R^D$ is alkyl of 2 carbons. In some embodiments, $R^D$ is alkyl of 3 carbons. In some embodiments, $R^D$ is alkyl of 4 carbons. In some embodiments, $R^D$ is alkyl of 5 carbons. In some embodiments, $R^D$ is alkyl of 6 carbons. In some embodiments, $R^D$ is alkyl of 7 carbons. In some embodiments, $R^D$ is substituted alkyl. In some embodiments, $R^D$ is substituted alkyl of 1 to 7 carbons.

In some embodiments, $R^D$ is substituted alkyl of at least 3 carbons. In some embodiments, $R^D$ is substituted alkyl of 3-7 carbons. In some embodiments, $R^D$ is substituted alkyl of 3 carbons. In some embodiments, $R^D$ is substituted alkyl of 4 carbons. In some embodiments, $R^D$ is substituted alkyl of 5 carbons. In some embodiments, $R^D$ is substituted alkyl of 6 carbons. In some embodiments, $R^D$ is substituted alkyl of 7 carbons.

In some embodiments, $R^D$ is alkaryl. In some embodiments, $R^D$ is alkaryl of at least 8 carbons. In some embodiments, $R^D$ is alkaryl of 8 to about 12 carbons. In some embodiments, $R^D$ is alkaryl of at least 14 carbons.

In some embodiments, $R^D$ is methyl, ethyl, tert-butyl, isopropyl, or tolyl. In some embodiments, $R^D$ is isopropyl or tolyl. In some embodiments, $R^D$ is isopropyl.

In some embodiments, $R^D$ is

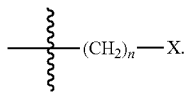

In some embodiments, n is 1-2. In some embodiments, n is 1. In some embodiments, n is 2. In some embodiments, n is 3.

In some embodiments, X is a pseudohalide. In some embodiments, X is $N_3$ or CN.

In some embodiments, X is halo. In some embodiments, X is F, Cl, or Br. In some embodiments, X is Cl or Br.

In some embodiments, $R^D$ is

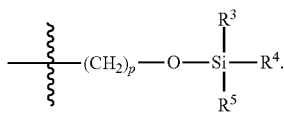

In some embodiments, p is 1-2. In some embodiments, p is 1, In some embodiments, p is 2. In some embodiments, p is 3.

In some embodiments, $R^4$ and $R^5$ are identical. In further embodiments, $R^4$ and $R^5$ are aryl. In further embodiments, $R^4$ and $R^5$ are alkyl. In certain embodiments, $R^4$ and $R^5$ are tertiary alkyl. In further embodiments, $R^4$ and $R^5$ are phenyl or methyl. In some embodiments, $R^4$ and $R^5$ are phenyl.

In some embodiments, $R^D$ is

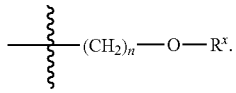

In further embodiments, n is 1. In further embodiments, n is 2. In further embodiments, n is 3.

In some embodiments, $R^x$ is alkyl, aryl, aralkyl, or alkaryl. In some embodiments, $R^x$ is alkyl or aryl. In some embodiments, $R^x$ is aralkyl. In some embodiments, $R^x$ is alkaryl.

In some embodiments $R^x$ is alkyl. In some embodiments, $R^x$ is substituted alkyl. In some embodiments, $R^x$ is substituted alkyl of 1 to about 10 carbons. In some embodiments, $R^x$ is substituted alkyl of 1 to about 6 carbons. In some embodiments, $R^x$ is substituted alkyl of 1 to about 3 carbons. In some embodiments, $R^x$ is unsubstituted alkyl. In some embodiments, $R^x$ is unsubstituted alkyl of 1 to about 10 carbons. In some embodiments, $R^x$ is unsubstituted alkyl of 1 to about 6 carbons. In some embodiments, $R^x$ is unsubstituted alkyl of 1 to about 3 carbons.

In some embodiments, $R^x$ is aryl. In some embodiments, $R^x$ is substituted aryl. In some embodiments, $R^x$ is substituted aryl of 6 to about 12 carbons. In some embodiments, $R^x$ is substituted aryl of 6 to about 8 carbons. In some embodiments, $R^x$ is unsubstituted aryl. In some embodiments, $R^x$ is unsubstituted aryl of 6 to about 12 carbons. In some embodiments, $R^x$ is unsubstituted aryl of 6 to about 8 carbons.

In some embodiments, m is 1. In some embodiments, m is 2. In some embodiments, m is 3.

In some embodiments, the polyolefin group has a molecular weight greater than 100 g/mol. In some embodiments, the polyolefin group has a molecular weight greater than 200 g/mol. In some embodiments, the polyolefin group has a molecular weight greater than 400 g/mol. In some embodiments, the polyolefin group has a molecular weight greater than 600 g/mol. In some embodiments, the polyolefin group has a molecular weight greater than 800 g/mol. In some embodiments, the polyolefin group has a molecular weight greater than 1000 g/mol. In some embodiments, the polyolefin group has a molecular weight greater than 5000 g/mol. In some embodiments, the polyolefin group has a molecular weight greater than 10,000 g/mol. In some embodiments, the polyolefin group has a molecular weight greater than 100,000 g/mol. In some embodiments, the polyolefin group has a molecular weight greater than 500,000 g/mol. In some embodiments, the polyolefin group has a molecular weight greater than 1,000,000 g/mol.

6. EXAMPLES

Certain embodiments provided herein are illustrated by the following non-limiting examples. Unless expressly stated to the contrary, all temperatures and temperature ranges refer to the Centigrade system and the term "room temperature" refers to about 20 to 25 degrees Celsius.

6.1 Examples 1-4

A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

110 mL hexane equilibrated at −60° C., 72 mL methylchloride equilibrated at −60° C., 0.43 gram 2-chloro-2,4,4-trimethylpentane equilibrated at room temperature, 0.23 mL 2,6-dimethylpyridine equilibrated at room temperature, and 17 mL of isobutylene equilibrated at −60° C.

Then, the contents of the round-bottom flask were mixed and equilibrated at −60° C.

With continued stirring, next 3.1 mL titanium tetrachloride was charged to the flask. The reaction was allowed to proceed 12 minutes and then 20 mL of the polymerization solution was charged to 60 mL test tubes, equipped with threaded caps, immersed in the heptane bath maintained at −60° C.

The polymerization was allowed to continue in each test tube for 14 additional minutes (26 total reaction minutes) at which point one of the tubes was terminated with 5 mL methanol to provide a comparative example prior to addition of a disulfide quencher. Immediately after completing the comparative example, 0.090 g of furfurylmethyldisulfide was added to one of the tubes containing a reactive polymerization, while other sulfide quenching agents were added to 3 of the remaining test tubes. The furfurylmethyldisulfide quenching reaction (and other quenching reactions) was allowed to proceed 15 minutes at which time 5 mL of methanol was charged to the tubes in order to terminate the quenching reaction. A final polymerization test tube which contained no quencher was then terminated with 5 g of methanol to provide a final comparative example (Control A). Non-quencher-containing reactions were used to provide a comparative baseline for the quenching reactions and to provide references for structural and molecular weight characterization in the absence of a quenching agent.

The reactant quantities for Examples 1-4 and Control A are listed in Table I. Results are shown in Table V (infra).

TABLE I

| Example | Disulfide | Disulfide (g) |
| --- | --- | --- |
| 1 | furfurylmethyldisulfide | 0.052 |
| 2 | dimethyldisulfide | 0.053 |
| 3 | diethyldisulfide | 0.068 |
| 4 | di-tert-butyldisulfide | 0.100 |
| Control A | None | 0 |

6.2 Examples 5-11

A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

110 mL hexane equilibrated at −60° C.,
73.4 mL methylchloride equilibrated at −60° C.,
0.62 gram 2-chloro-2,4,4-trimethylpentane equilibrated at room temperature,
0.23 mL 2,6-dimethylpyridine equilibrated at room temperature, and
13.3 mL of isobutylene equilibrated at −60° C.

Then, the contents of the round-bottom flask were mixed and equilibrated at −60° C.

With continued stirring, next 2.28 mL titanium tetrachloride was charged to the flask. The reaction was allowed to proceed 17 minutes and then 1.32 mL diisopropyldisulfide was charged to the polymerization. The solution was immediately poured into 60 mL test tubes, equipped with threaded caps, immersed in the heptane bath maintained at −60° C.

The quenching reaction was allowed to continue in each test tube for 10 minutes at which point 0.80 mL methanol was charged to one of the tubes (example 5). Various terminators were charged to the remaining tubes as separate examples (6-11).

The reactant quantities for Examples 5-11 are listed in Table II. Results are shown in Table V (infra).

TABLE II

| Example | Terminator | Terminator (g) |
| --- | --- | --- |
| 5 | methanol | 0.80 |
| 6 | ethanol | 1.148 |
| 7 | isopropanol | 1.498 |
| 8 | 2-ethylhexanol | 3.246 |
| 9 | n-butylamine | 1.823 |
| 10 | 2-ethylhexylamine | 1.91 |
| 11 | tert-amylamine | 2.172 |

6.3 Examples 12-16

A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

72.6 mL hexane equilibrated at −60° C.,
48.4 mL methylchloride equilibrated at −60° C.,
3.43 gram 2-chloro-2,4,4-trimethylpentane equilibrated at room temperature,
0.23 mL 2,6-dimethylpyridine equilibrated at room temperature, and
73.6 mL of isobutylene equilibrated at −60° C.

Then, the contents of the round-bottom flask were mixed and equilibrated at −60° C.

With continued stirring, next 1.27 mL titanium tetrachloride was charged to the flask. The reaction was allowed to proceed 27 minutes and then 4.05 mL diisopropyldisulfide was charged to the polymerization followed by immediate addition of 4.3 mL titanium tetrachloride. The solution was immediately poured into 60 mL test tubes, equipped with threaded caps, immersed in the heptane bath maintained at −60° C.

The quenching reaction was allowed to continue in each test tube for 16 minutes at which point 2.807 g ethanol was charged to one of the tubes (example 12). Various terminators were charged to the remaining tubes as separate examples (13-16).

The reactant quantities for Examples 12-16 are listed in Table III. Results are shown in Table V (infra).

TABLE III

| Example | Terminator | Terminator (g) |
| --- | --- | --- |
| 12 | ethanol | 2.807 |
| 13 | sec-butanol | 4.516 |
| 14 | isopropanol | 3.661 |
| 15 | ethanethiol | 3.785 |
| 16 | n-propanethiol | 4.640 |

6.4 Examples 17-21

A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

110 mL hexane equilibrated at −60° C.,
73.4 mL methylchloride equilibrated at −60° C.,
0.62 gram 2-chloro-2,4,4-trimethylpentane equilibrated at room temperature,
0.23 mL 2,6-dimethylpyridine equilibrated at room temperature, and
13.3 mL of isobutylene equilibrated at −60° C.

Then, the contents of the round-bottom flask were mixed and equilibrated at −60° C.

With continued stirring, next 2.28 mL titanium tetrachloride was charged to the flask. The reaction was allowed to proceed 18 minutes and then 1.89 mL ditolyldisulfide was charged to the polymerization. The solution was immediately poured into 60 mL test tubes, equipped with threaded caps, immersed in the heptane bath maintained at −60° C.

The quenching reaction was allowed to continue in each test tube for 16 minutes at which point 1.40 g methanol was charged to one of the tubes (example 17). Various terminators were charged to the remaining tubes as separate examples (18-21). A final polymerization test tube which contained no quencher was then terminated with 5 g of methanol to provide a final comparative example (Control B). Non-quencher-containing reactions were used to provide a comparative baseline for the quenching reactions and to provide references for structural and molecular weight characterization in the absence of a quenching agent.

The reactant quantities for Examples 17-21 and Comparative B are listed in Table IV. Results are shown in Table V (infra).

TABLE IV

| Example | Terminator | Terminator (g) |
|---------|------------|----------------|
| 17 | methanol | 1.40 |
| 18 | isopropanol | 2.62 |
| 19 | n-butylamine | 3.19 |
| 20 | triethylamine | 4.41 |
| 21 | n-propanethiol | 3.32 |
| B | methanol | 5.0 |

6.5 Example 22

A four-neck 1000 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

189 mL hexane equilibrated at −60° C.,
216 mL methylchloride equilibrated at −60° C.,
6.25 gram 2-chloro-2,4,4-trimethylpentane equilibrated at room temperature,
0.48 mL 2,6-dimethylpyridine equilibrated at room temperature, and
135 mL of isobutylene equilibrated at −60° C.

Then, the contents of the round-bottom flask were mixed and equilibrated at −60° C.

With continued stirring, next 2.03 mL titanium tetrachloride was charged to the flask to initiate the isobutylene polymerization. The polymerization was allowed to proceed 90 minutes and then 14.13 g dibromoethyldisulfide was charged to the polymerization. Immediately after the quencher addition, 30.24 mL titanium tetrachloride was charged to the reaction mixture and the solution was allowed to react 22 minutes. The reaction was then terminated by addition of 29.3 mL triethylamine equilibrated at −60° C. The solution was stirred for 10 minutes and then 73.2 mL methanol equilibrated at −60° C. was charged to reaction slowly. The solution was removed from the glove box and volatile components were evaporated under ambient conditions. The hexane/polyisobutylene layer was washed with a 5% aqueous HCl solution and then deionized $H_2O$ until extracts were neutral. The wet organic phase was dried over $MgSO_4$, filtered, and concentrated on a roto-evaporator. Results are shown in Table V (infra).

6.6 Example 23

A four-neck 1000 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

169 mL hexane equilibrated at −60° C.,
156 mL methylchloride equilibrated at −60° C.,
5.41 gram 2-chloro-2,4,4-trimethylpentane equilibrated at room temperature,
0.35 mL 2,6-dimethylpyridine equilibrated at room temperature, and
65.4 mL of isobutylene equilibrated at −60° C.

Then, the contents of the round-bottom flask were mixed and equilibrated at −60° C.

With continued stirring, 1.44 mL titanium tetrachloride was charged to the flask to initiate the isobutylene polymerization. The polymerization was allowed to proceed 60 minutes and then 8.34 g dichloroethyldisulfide was charged to the polymerization. Immediately after the quencher addition, 34.5 mL titanium tetrachloride was charged to the reaction mixture and the solution was allowed to react 10 minutes. The reaction was then terminated by addition of 30.4 mL triethylamine equilibrated at −60° C. The solution was stirred for 10 minutes and then 81 mL methanol equilibrated at −60° C. was charged to reaction slowly. The solution was removed from the glove box and volatile components were evaporated under ambient conditions. The hexane/polyisobutylene layer was washed with a 5% aqueous HCl solution and then deionized $H_2O$ until extracts were neutral. The wet organic phase was dried over $MgSO_4$, filtered, and concentrated on a roto-evaporator. Results are shown in Table V (infra).

6.7 Example 24

A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

110 mL hexane equilibrated at −60° C.,
73 mL methylchloride equilibrated at −60° C.,
0.62 gram 2-chloro-2,4,4-trimethylpentane equilibrated at room temperature,
0.23 mL 2,6-dimethylpyridine equilibrated at room temperature, and
13.3 mL of isobutylene equilibrated at −60° C.

Then, the contents of the round-bottom flask were mixed and equilibrated at −60° C.

With continued stirring, 2.28 mL titanium tetrachloride was charged to the flask to initiate the isobutylene polymerization. The polymerization was allowed to proceed 17 minutes and then 3.15 g tert-butyldiphenylsiloxyethyldisulfide was charged to the polymerization and allowed to react 15 minutes. The reaction was then terminated by addition of 18.4 mL dibutylamine. The solution was removed from the glove box and volatile components were evaporated under ambient conditions. The hexane/PIB layer was washed with a 5% aqueous HCl solution and then deionized $H_2O$ until extracts were neutral. The wet organic phase was dried over $MgSO_4$, filtered, and concentrated on a roto-evaporator. Results are shown in Table V (infra).

6.8 Procedure for Collecting $^1$H NMR Data $^1$H NMR spectra were collected using a Varian (300 MHz) spectrophotometer using samples concentrations of 3 percent to 5 percent (weight/weight) in $CDCl_3$. $^1$H NMR spectra were used for analysis of the end groups. Fractions of exo-olefin, endo-olefin, tert-chloride, coupled olefin, and sulfide (PIBthioether) chain ends were obtained using $^1$H NMR integration as described in the following section.

6.8.1 Procedure for Calculating the Fractional Amounts of Chain Ends on the Polyisobutylene Product The fractions of exo-olefin, endo-olefin, sulfide (PIBthioether), tert-chloride chain ends, and coupled products in the polyisobutylene samples were quantified using $^1$H NMR integration. In some instances coupled products were deemed to be absent by qualitative inspection of the $^1$H NMR spectrum, and by confirming the absence of a shoulder on the low elution volume side of the main polymer peak in the Gel Permeation Chromatography chromatogram.

The fractional molar amount of each type of chain end was obtained using an equation analogous to the equation given below for determining the fractional amount of exo-olefin, $$F(\text{exo}) = (A_{exo})/(A_{exo} + A_{endo} + A_{tert\text{-}Cl} + A_{sulfide} + 2A_{coupled}) \quad (1)$$

where $A_{endo}$ is the area of the single olefinic resonance at 5.15 ppm, $A_{exo}$ is the area of the exo-olefinic resonance 4.63 ppm, and $A_{tert\text{-}Cl}$ was calculated as follows:

$$A_{tert\text{-}Cl} = (A_{1.65\text{-}1.72}/6) - A_{endo} \quad (2)$$

or $$A_{tert\text{-}Cl} = (A_{1.95}/2)$$

where $A_{1.65\text{-}1.72}$ is the integrated area of the convoluted peaks associated with the gem-dimethyl protons of the endo-olefin and the tert-chloride chain ends and $A_{1.95}$ is the integrated area of the peak associated with methylene protons on the end of the polyisobutene chain. In some cases, sulfide terminated PIB yielded peaks in the area between 1.65 and 1.72, which made it very difficult to accurately measure the area associated with only the tert-Cl chain ends; therefore, in those cases, we utilized the peak at 1.95 for quantification of tert-Cl chain ends. It will be noted that a co-efficient of 2 appears in equation (1) for coupled product, to account for the fact that creation of these products consumes 2 polyisobutylene chains. $A_{coupled}$ was calculated as follows:

$$A_{coupled} = (A_{5.0\text{-}4.75} - A_{4.5\text{-}4.75})/2 \quad (3)$$

where $A_{5.0\text{-}4.75}$ is the integrated area of the convoluted peaks associated with one of the exo-olefin protons and the two identical protons of the coupled product, and where $A_{4.5\text{-}4.75}$ is the integrated area of the peak associated with the other exo-olefin proton.

The integrated area and fractional amount of sulfide terminated PIB were obtained on a product-specific basis. Typically, a well-resolved peak associated with the proton(s) of the non-polyisobutenyl residue of the thioether chain end was integrated. For example, in Example 9 of the present invention, the area associated with the singe proton of the isopropyl group (multiplet at 2.93 ppm) attached to sulfur on the PIB chain end was integrated in order to quantify the amount of sulfide chain ends in the composition (see figure below).

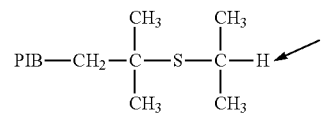

6.9 Results

The results for all examples described, supra, are summarized in Table V.

TABLE V

Molar Composition of Chain Ends after Quenching Reaction

| Ex | Disulfide | Terminator | Vinylidene terminated (mole %) | Endo Olefin (mole %) | Tert-Cl (mole %) | Coupled (mole %) | Sulfide-terminated Polyolefin (mole %) | Other |
|---|---|---|---|---|---|---|---|---|
| 1 | Furfuryl-methyl | Methanol | 22 | 2 | 2 | 0 | 74 | 0 |
| 2 | Dimethyl | Methanol | 23 | 1 | 1 | 0 | 75 | 0 |
| 3 | Diethyl | Methanol | 40 | 2 | 1 | 2 | 55 | 0 |
| 4 | di-tert-butyl | Methanol | 69 | 1 | 15 | 15 | 0 | 0 |
| A | None | Methanol | 4 | 1 | 94 | 1 | 0 | 0 |
| 5 | Diisopropyl | Methanol | 78.6 | 4.4 | 8.9 | 0.5 | 0.0 | 7.6 |
| 6 | Diisopropyl | Ethanol | 77.7 | 4.3 | 16.2 | 1.7 | 0.0 | 0.1 |
| 7 | Diisopropyl | Isopropanol | 84.3 | 3.5 | 11.5 | 0.6 | 0.0 | 0.1 |
| 8 | Diisopropyl | 2-ethylhexanol | 86.5 | 5.8 | 7.6 | 0.1 | 0.0 | 0.0 |
| 9 | Diisopropyl | n-butylamine | 10.3 | 0.0 | 0.0 | 0.8 | 88.9 | 0 |
| 10 | Diisopropyl | 2-ethylhexylamine | 10.0 | 0.9 | 0.9 | 0.5 | 87.7 | 0 |
| 11 | Diisopropyl | Tert-amylamine | 10.3 | 0.0 | 0.0 | 0.8 | 88.9 | 0 |
| 12 | Diisopropyl | Ethanol | 80.5 | 5.2 | 14.0 | 0.4 | 0.0 | 0 |
| 13 | Diisopropyl | sec-butanol | 82.5 | 5.1 | 11.8 | 0.6 | 0.0 | 0 |
| 14 | Diisopropyl | Isopropanol | 82.8 | 6.1 | 10.3 | 0.7 | 0.0 | 0.1 |
| 15 | Diisopropyl | ethanethiol | 3.6 | 2.2 | 22.4 | 0.0 | 71.8 | 0 |
| 16 | Diisopropyl | n-propanethiol | 3.5 | 0.3 | 13.0 | 0.0 | 83.2 | 0 |
| 17 | Ditolyl | Methanol | 11.8 | 1.5 | 39.1 | 0.0 | 29.5 | 18.1 |
| 18 | Ditolyl | Isopropanol | 29.9 | 2.0 | 6.9 | 0.0 | 38.5 | 22.7 |
| 19 | Ditolyl | n-butylamine | 9.0 | 0.9 | 4.7 | 0.0 | 81.3 | 4.1 |
| 20 | Ditolyl | triethylamine | 14.6 | 0.0 | 0.0 | 0.0 | 85.4 | 0 |
| 21 | Ditolyl | n-propanethiol | 0.0 | 0.0 | 1.6 | 0.0 | 86.0 | 12.4 |
| B | None | Methanol | 2.0 | 0.4 | 97.6 | 0.0 | 0.0 | 0.0 |
| 22 | Dibromo-ethyl | Triethylamine | 3 | 0 | 0 | 0 | 97 | 0 |
| 23 | Dichloro-ethyl | Triethylamine | 3 | 0 | 0 | 0 | 97 | 0 |
| 24 | Di-tert-butyldiphenyl siloxyethyl | dibutylamine | 11 | 0 | 0 | 3 | 86 | 0 |

In example 15, the 71.8% total sulfide-terminated polyolefin product is a mixture of 73 mole percent isopropylsulfide-terminated product and 27 mole percent ethylsulfide-terminated product.

In example 16, the sulfide-terminated polyolefin product is 100 mole percent n-propylsulfide-terminated product.

In example 21, the sulfide-terminated polyolefin product is 100 mole percent tolylsulfide-terminated product.

The embodiments and examples described above are intended to be merely exemplary, and such examples and embodiments are non-limiting. One of ordinary skill in the art will recognize, or will be able to ascertain using no more than routine experimentation, modifications of the embodiments and examples described herein. Such modifications are considered to be within the scope of the claimed subject matter and are encompassed by the appended claims.

What is claimed:

1. A method for preparing a compound of formula V:

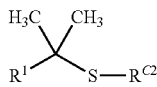
V wherein:
   $R^1$ is a polyolefin group; and
   $R^{C2}$ is alkyl, aryl, aralkyl, alkaryl, substituted alkyl, or substituted aryl; comprising:
(a) ionizing a polyolefin in the presence of a Lewis acid or mixture of Lewis acids to form an ionized polyolefin;
(b) reacting the ionized polyolefin with one or more compounds of formula VI:

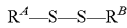
VI to form an intermediate;
   wherein $R^A$ and $R^B$ are each, independently, alkyl, aryl, aralkyl, or alkaryl; and
(c) reacting the intermediate from step (b) with one or more compounds of formula VII:

VII

2. The method of claim 1, wherein $R^1$ is a polyisobutylene group.

3. The method of claim 1, wherein $R^{C2}$ is alkyl and $R^A$ and $R^B$ are each, independently, alkyl, aryl, or alkaryl.

4. The method of claim 1, wherein $R^A$ and $R^B$ are the same.

5. The method of claim 4, wherein $R^A$ and $R^B$ are isopropyl or tolyl.

6. The method of claim 1, wherein the one or more compounds of formula VII are one or more of ethanethiol or n-propanethiol.

7. A method for preparing a vinylidene terminated polyolefin, comprising:
(a) ionizing a polyolefin in the presence of a Lewis acid or mixture of Lewis acids to form an ionized polyolefin;
(b) reacting the ionized polyolefin from step (a) with one or more disulfides to form an intermediate; and
(c) reacting the intermediate of step (b) with one or more alcohols or amines.

8. The method of claim 7, wherein the vinylidene terminated polyolefin is a vinylidene terminated polyisobutylene.

9. The method of claim 7, wherein the intermediate of step (b) is reacted with one or more alcohols.

10. The method of claim 9, wherein the one or more alcohols are of the formula:

wherein R is alkyl of 1-8 carbons.

11. The method of claim 10, wherein the one or more alcohols are one or more of methanol, ethanol, isopropanol, 2-ethylhexanol, or sec-butanol.

12. The method of claim 7, wherein the one or more disulfides are a compound of formula I:

I wherein $R^A$ and $R^B$ are each, independently, alkyl, aryl, aralkyl, alkaryl,

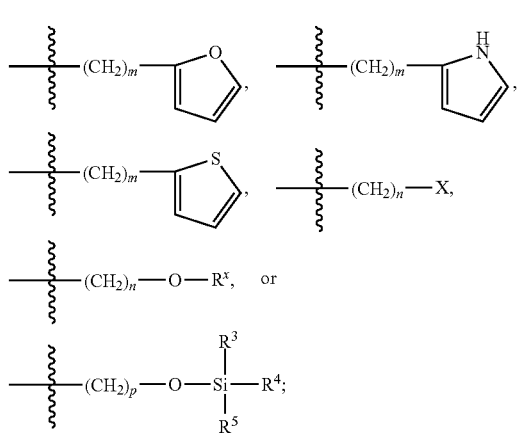

wherein:
   m is 1-3; n is 1-3; p is 1-3;
   X is halo or a pseudohalide;
   $R^x$ is alkyl or aryl;
   $R^3$ is tert-butyl; and
   $R^4$ and $R^5$ are each, independently, alkyl, aryl, aralkyl, or alkaryl.

13. The method of claim 12, wherein $R^A$ and $R^B$ are methyl, ethyl, tert-butyl, isopropyl, or tolyl.

14. The method of claim 13, wherein $R^A$ and $R^B$ are isopropyl.

15. The method of claim 1, wherein the ionized polyolefin is formed by adding a Lewis acid to a tert-halide terminated polyolefin or adding a Lewis acid and a proton source to a preformed polyolefin.

16. The method of claim 7, wherein the ionized polyolefin is formed by adding a Lewis acid to a tert-halide terminated polyolefin or adding a Lewis acid and a proton source to a preformed polyolefin.

17. The method of claim 1, wherein the ionized polyolefin is a quasiliving carbocationic polyolefin and the method is performed under quasiliving carbocationic polymerization conditions.

18. The method of claim 17, wherein the quasiliving carbocationic polyolefin is prepared by adding a Lewis acid and a monomer to an initiator in the presence of an electron donor, common ion salt, or common ion salt precursor.

19. The method of claim 18, wherein the initiator is 2-chloro-2,4,4-trimethylpentane, 1,3-di(2-chloro-2-propyl)-5-tert-butylbenzene, or dicumyl chloride.

20. The method of claim 18, wherein the monomer is isobutylene or styrene.

21. The method of claim 18, wherein the electron donor is pyridine or a pyridine derivative.

22. The method of claim 21, wherein the electron donor is 2,6-dimethylpyridine, 2,4-dimethylpyridine, or 2,6-di-tert-butylpyridine.

23. The method of claim 18, wherein the common ion salt precursor is tetrabutylammonium chloride or tetrabutylammonium iodide.

24. The method of claim 7, wherein the ionized polyolefin is a quasiliving carbocationic polyolefin and the method is performed under quasiliving carbocationic polymerization conditions.

25. The method of claim 24, wherein the quasiliving carbocationic polyolefin is prepared by adding a Lewis acid and a monomer to an initiator in the presence of an electron donor, common ion salt, or common ion salt precursor.

26. The method of claim 25, wherein the initiator is 2-chloro-2,4,4-trimethylpentane, 1,3-di(2-chloro-2-propyl)-5-tert-butylbenzene, or dicumyl chloride.

27. The method of claim 25, wherein the monomer is isobutylene or styrene.

28. The method of claim 25, wherein the electron donor is pyridine or a pyridine derivative.

29. The method of claim 25, wherein the electron donor is 2,6-dimethylpyridine, 2,4-dimethylpyridine, or 2,6-di-tert-butylpyridine.

30. The method of claim 25, wherein the common ion salt precursor is tetrabutylammonium chloride or tetrabutylammonium iodide.

31. The method of claim 1, wherein the Lewis acid is a titanium tetrahalide, a boron trihalide, an aluminum trihalide, a tin tetrahalide, zinc chloride, or ethyl aluminum dichloride, or a mixture thereof.

32. The method of claim 31, wherein the Lewis acid is titanium tetrachloride.

33. The method of claim 1, wherein a mixture of Lewis acids is used.

34. The method of claim 33, wherein the mixture of Lewis acids is a mixture of an aluminum (III) halide and a trialkyl aluminum compound.

35. The method of claim 7, wherein the Lewis acid is a titanium tetrahalide, a boron trihalide, an aluminum trihalide, a tin tetrahalide, zinc chloride, or ethyl aluminum dichloride, or a mixture thereof.

36. The method of claim 35, wherein the Lewis acid is titanium tetrachloride.

37. The method of claim 7, wherein a mixture of Lewis acids is used.

38. The method of claim 37, wherein the mixture of Lewis acids is a mixture of aluminum (III) bromide and trimethyl aluminum.

39. The method of claim 1, wherein a diluent is used.

40. The method of claim 39, wherein the diluent is an alkane, an alkyl halide, or a mixture thereof.

41. The method of claim 7, wherein a diluent is used.

42. The method of claim 41, wherein the diluent is an alkane, an alkyl halide, or a mixture thereof.

43. The method of claim 1, wherein the method is performed at a temperature from about −120° C. to about 0° C.

44. The method of claim 43, wherein the temperature is from about −70° C. to about −40° C.

45. The method of claim 7, wherein the method is performed at a temperature from about −120° C. to about 0° C.

46. The method of claim 45, wherein the temperature is from about −70° C. to about −40° C.

47. The method of claim 1, wherein the Lewis acid or mixture of Lewis acids are present at a molar concentration of from about 0.5 to about 20 times chain-end molar concentration.

48. The method of claim 7, wherein the Lewis acid or mixture of Lewis acids are present at a molar concentration of from about 0.5 to about 20 times chain-end molar concentration.

49. The method of claim 18, wherein step (b) is added after high conversion of the monomer.

50. The method of claim 25, wherein step (b) is added after high conversion of the monomer.

51. The method of claim 1, wherein the compound of formula V formed is at least 70 mole percent of all products.

52. The method of claim 7, wherein the vinylidene terminated polyolefin formed is at least 70 mole percent of all products.

* * * * *